(12) United States Patent
Ikeda

(10) Patent No.: US 7,630,785 B2
(45) Date of Patent: Dec. 8, 2009

(54) SUBSTRATE PROCESSING SYSTEM FOR SETTING UNIFORM MODULE CYCLE LENGTH AND ACCESS CONTROL TIME LAG IN TWO PIPELINE PROCESSING SYSTEMS

(75) Inventor: Gaku Ikeda, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 434 days.

(21) Appl. No.: 11/300,309

(22) Filed: Dec. 15, 2005

(65) Prior Publication Data

US 2006/0155412 A1  Jul. 13, 2006

(30) Foreign Application Priority Data

Jan. 7, 2005  (JP) ............................. 2005-002828

(51) Int. Cl.
*G06F 19/00* (2006.01)
(52) U.S. Cl. ..................... 700/100; 700/112; 700/121
(58) Field of Classification Search ........... 700/99–102, 700/112, 121
See application file for complete search history.

(56) References Cited

U.S. PATENT DOCUMENTS 5,436,848 A 7/1995 Nishida et al.
6,714,832 B1 * 3/2004 Nishihata et al. ............ 700/121
2002/0076306 A1 * 6/2002 Tateyama et al. ...... 414/225.01

FOREIGN PATENT DOCUMENTS

| JP | 4-113612 | 4/1992 |
| JP | 5-3174 | 1/1993 |
| JP | 2000-127069 | 5/2000 |
| JP | 2000-150619 | 5/2000 |

* cited by examiner

*Primary Examiner*—Ryan A Jarrett
(74) *Attorney, Agent, or Firm*—Oblon, Spivak, McClelland, Maier & Neustadt, L.L.P.

(57) ABSTRACT

In a substrate processing system according to the present invention, module cycle periods at a plurality of process modules $PM_1$ through $PM_4$ connected around a transfer module TM having installed therein a vacuum pressure-side transfer robot $RB_1$, each representing the sum of a wafer stay time including the wafer processing time and an attendant busy time during which the wafer is transferred before and after the wafer stay time, are all set to a uniform length. The vacuum pressure-side transfer robot $RB_1$ takes out a processed wafer $W_i$ and carries a next wafer $W_{i+1}$ to be processed next by executing a pick and place operation for each of the process modules $PM_1$ through $PM_4$ during a single access to the process module.

19 Claims, 12 Drawing Sheets

SUBSTRATE PROCESSING SYSTEM FOR SETTING UNIFORM MODULE CYCLE LENGTH AND ACCESS CONTROL TIME LAG IN TWO PIPELINE PROCESSING SYSTEMS

CROSS-REFERENCE TO RELATED APPLICATION

This document claims priority to Japanese Patent Application No. 2005-002828, filed Jan. 7, 2005, the entire contents of which are hereby incorporated by reference.

FIELD OF THE INVENTION

The present invention relates to a substrate processing system and a substrate processing program for executing sequential processing on a batch of substrates transferred sequentially into a plurality of process modules, one substrate at a time.

BACKGROUND OF THE INVENTION

A substrate processing system used in this type of application in the related art may adopt a cluster tool (multi-chamber) structure with a plurality of process modules connected around a main transfer chamber (common transfer chamber) so as to integrate the flow of various processes to smooth the flow of the processes or to enable execution of more diverse processes. Typically, such a substrate processing system is adopted in conjunction with a semiconductor manufacturing apparatus (see, for instance, Japanese Laid Open Patent Publication No. 2000-127069).

A cluster tool utilized for, for instance, thin-film formation includes a load-lock module connected to the main transfer chamber via a gate valve. When executing a specific type of processing on substrates to be processed (hereafter to be referred to simply as "substrates") such as semiconductor wafers (hereafter also referred to simply as "wafers"), the main transfer chamber as well as the individual process module chambers is sustained in a state of vacuum. After a wafer is transferred into a load-lock module that is at one atmosphere (atmosphere-side pressure), the load-lock module is depressurized to a low pressure state (vacuum-side pressure). The wafer is then taken out of the load-lock module on the vacuum side and is carried into the main transfer chamber by a transfer mechanism (such as a robot arm) installed in the main transfer chamber from which it is transferred into the first process module by the transfer mechanism.

In the first process module, a first processing step is executed for a predetermined length of time based upon a preset recipe. During the first processing step, film formation, for instance, may be executed to form a first thin-film layer on the wafer. Once the first processing step ends, the wafer having undergone the first processing step is carried out from the first process module by the transfer mechanism installed in the main transfer chamber and is carried into the second process module.

In the second process module, a second processing step is executed over a predetermined length of time based upon a preset recipe as in the first process module. During the second processing step, film formation, for instance, may be executed to form a second thin-film layer over the first layer having been formed on the wafer. Once the second processing step ends, the wafer having undergone the second processing step is carried out of the second process module by the transfer mechanism in the main transfer chamber and if it is to further undergo a subsequent processing step, it is carried into the next process module (e.g., a third process module) and undergoes the next processing step for a predetermined length of time. The semiconductor wafer thus undergoes various processing steps and when all the processing steps have been executed, the semiconductor wafer is carried back into the load-lock module.

As the processed wafer having undergone the series of processing steps in the individual process modules is transferred back into the load-lock module and the pressure inside load-lock module is switched from the vacuum-side pressure to the atmosphere-side pressure. The processed wafer is then carried out of the load-lock module via a wafer intake/outlet located on the side opposite from the side where the main transfer chamber is connected.

This type of cluster tool is ideal in applications in an in-line substrate processing system that executes a series of processing (e.g., film formation processing and heat treatment) on a batch of wafers sequentially transferred to a plurality of process modules at vacuum-side pressure, one wafer at a time.

In a cluster tool such as that described above, the transfer mechanism in the main transfer chamber is normally able to access a single process module at a time, i.e., the transfer mechanism is not normally able to access two process modules at once. Accordingly, the transfer mechanism accesses one of the process modules at a time to transfer a wafer into the process module. Then, the processing is executed in the individual process modules over the predetermined lengths of time according to the corresponding recipes (process jobs), and the processed wafer is carried out of a process module where the recipe processing has been completed if the transfer mechanism is not currently engaged in a transfer of another wafer.

When the batch of wafers is processed in the various process modules over varying lengths of processing time in, for instance, a pipeline system, the recipe processes executed in the plurality of process modules may end with conflicting timing or at time points too close to one another due to different processing cycles in the individual process modules. For this reason, the timing with which a wafer should be carried into/out of a given process module may conflict with the wafer transfer timing for another process module.

More specifically, in the cluster tool described above, for instance, the recipe process executed in the first processing step in the first process module may end while a wafer having undergone the second recipe process executed in the second processing step in the second process module and taken out of the second process module is being transferred toward the load-lock module by the transfer mechanism. Under such circumstances, the transfer mechanism first transfers the wafer having undergone the second processing step to the load-lock module, then accesses the first process module, takes out the wafer having undergone the first processing step and transfers it into the second process module.

Such a wafer a transfer procedure is less than ideal in that the transfer efficiency and the process module operation rates are not maximized. In more specific terms, after the processing period in the first step ends in the first process module, the wafer having undergone the first processing step must be kept in standby in the first process module until the transfer mechanism becomes available to carry the wafer out of the first process module in the example described above.

In this situation, if the total length of required time per wafer corresponding to the first process module, which includes the length of the first processing step, the length of time required to transfer the wafer into the first process module and the length of time required to transfer the wafer out of the first process module, is the largest among all the process modules (if the total length of required time per wafer is greater than any of the total lengths of time per wafer corresponding to all the other process modules), the greatest total length of time required per wafer is even further lengthened by the length of time during which the wafer having undergone the first processing step is kept in standby. The lengthened processing cycle resulting from the extended total length of required time per wafer in the first process module, which is the greatest among the plurality of process modules in the first place, is bound to affect the transfer tactic in the entire cluster tool.

At the same time, the next wafer to be processed is not carried into the second process module immediately after the wafer having undergone the second processing step is carried out and thus, the gate valve is closed. Only after transferring the wafer having undergone the second processing step to the load-lock module, the transfer mechanism accesses the first process module to transfer the wafer having undergone the first processing step from the first process module to the second process module for the second processing step. Thus, after the wafer having undergone the second processing step is carried out of the second process module, a time lag ensues before the gate valve is opened again to allow the next wafer to be carried in.

Since the processed wafer and the next wafer to undergo the processing cannot be carried out and carried in at once, as described above, the open/close operation of the gate valve, the transfer operation by the transfer mechanism and the like must be executed many times, which is bound to lower the throughput. In addition, a wait period occurs in the second process module before the recipe process on the next wafer can be started. Thus, if the total length of time required per wafer corresponding to the second process module is the greatest among all the process modules, the time length of the cycle (or interval) corresponding to the greatest total length of time required per wafer at the second process module is further increased by the extent corresponding to the length of the wait period. In such a case, too, the transfer tactic in the entire system is adversely affected. Such deterioration in the transfer tactic is bound to result in reduced operation rates of the process modules and lowered throughput.

Furthermore, post-processing (after recipe process) such as an $N_2$ purge may be executed after the wafer having undergone the recipe process is carried out of a given process module. The next wafer to undergo the processing cannot be carried into the process module while this post-processing is in progress. If such post-processing is executed in the process module requiring the greatest total length of time per wafer, the total length of required time is further extended, which causes further deterioration of the transfer tactic in the overall system.

SUMMARY OF THE INVENTION

An object of the present invention, which has been completed by addressing the problems of the related art discussed above, is to provide a substrate processing system and a substrate processing program to be adopted in a cluster tool, with which wafers can be transferred out of/into a plurality of process modules with non-conflicting timing even when the lengths of time required to process wafers in the individual process modules are different and the throughput of the entire system can be improved by assuring better transfer efficiency.

The object described above is achieved in an aspect of the present invention by providing a substrate processing system comprising a transfer mechanism that transfers a substrate to be processed (hereafter referred to simply a substrate) and a plurality of process modules disposed around the transfer mechanism so that the process modules are accessible by the transfer mechanism. With this system, a series of processing can be executed on a batch of substrates sequentially transferred by the transfer mechanism to the individual process modules one substrate at a time. The system includes a control unit that executes processing for setting module cycle period lengths corresponding to the individual process modules, each representing the sum of a substrate stay time, over which a single substrate needs to stay in a process module to undergo processing therein, and the lengths of attendant busy time during which functions of the process module are engaged on the substrate before and after the substrate stay time, equal to one another, and transfer processing for carrying out a processed substrate and carrying in a substrate to be processed next as a replacement thereof into each module by accessing with the transfer mechanism the various process modules in an order matching the sequence through which the substrate is processed so as to adjust cycles at the individual process modules to the uniform module cycle period having been set.

In the substrate processing system according to the present invention described above, the lengths of module cycle periods for all the process modules to be engaged in operation simultaneously in the substrate processing system are set to a single specific length before the processing of a batch of substrates starts and thus, the lengths of time (cycles) each required to process a single substrate at a given process module become uniform.

Then, as the processing on the batch of substrates starts, the transfer mechanism accesses the individual process modules in the order matching the sequence with which a substrate is processed. For instance, the transfer mechanism may access a first process module where the first processing step is executed to carry out a processed substrate and carry in an unprocessed substrate as a replacement thereof. Then, it may access a second process module where a second processing step is executed to carry out a processed substrate and carry in the substrate having undergone the first processing step and taken out of the first process module earlier.

This transfer processing is executed by assuring that the processing cycles at the individual process modules conforming to the uniform module cycle period. As a result, regardless of specific details of the processing executed on substrates in the individual process modules (e.g., processing types and the lengths of time required for the actual processing), e.g., regardless of the length of time required for the actual processing which may be different from one another, the substrates can be carried out of/into the individual process modules with uniform transfer cycles.

In addition, since the transfer mechanism accesses the individual process modules in sequence in the order matching the sequence with which each substrate is processed to carry out/in substrates. This means that the transfer cycles over which the substrates are carried out of/into the various process modules are offset with a specific time lag. As a result, the wafer processing cycle during which a single substrate is processed in each process module is offset from the wafer processing cycles at the other process modules and consequently, substrates can be carried out of/into process modules in any combination with non-conflicting timing.

In addition, the substrate stay time described above may include the length of processing time required to process the substrate in the process module. Also, the attendant busy time includes the length of time required by the transfer mechanism to carry the substrate into the process module and the length of time required by the transfer mechanism to carry out the substrate from the process module. If post processing needs to be executed in a given process module on behalf of the substrate having just been carried out from the process module, the attendant busy time of the process module should also include the length of time required to execute the post-processing.

It is desirable to use the process module with the largest total length of required time representing the sum of the length of time required to process a single substrate and the length of the attendant busy time among the process modules as a reference process module and to set the greatest total length of required time corresponding to this process module as the module cycle period. Accordingly, in a process module with a total length of required time representing the sum of the length of time required to process a single substrate and the length of the attendant busy time, which is smaller than the module cycle period, among the plurality of process modules, the difference between the module cycle period and its total length of required time should be allocated as a wait time, during which a substrate is kept in standby in the process module and the length of time calculated by adding this wait time to the total length of required time should be set as the module cycle period for the particular process module.

As described above, in a process module with a total length of required time representing the sum of the length of time required to process a single substrate and the length of the attendant busy time, which is smaller than the module cycle period, the difference between the module cycle period and its total length of required time is allocated as a wait time to elapse during the substrate stay time. As a result, the time difference between the module cycle period and the total length of required time is not allowed to affect the transfer cycle (transfer tactic) with which two wafers are transferred for successive processing. The "transfer tactic" as referred to in the description of the present invention is determined by the greatest total length of required time corresponding to the reference process module and is not affected by the wait time that elapses during the substrate stay time.

In addition, the wait time may occur prior to the processing time or following the processing time within the duration of the total length of required time. If the wait time occurs prior to the processing time within the duration of the total length of required time, the wait time elapses after a substrate is carried in and then the processing of the substrate starts. If, on the other hand, the wait time follows the processing time within the duration of the total length of required time, the wait time elapses after the processing on a substrate is completed and then the processed substrate is carried out.

In addition, when the first substrate in the batch of substrates is sequentially processed in the plurality of process modules, it is desirable to carry the first substrate into each process module, except for the first process module where the first substrate undergoes the first processing after the module cycle period corresponding to a virtual substrate, which does not exist in reality but is assumed to have been processed prior to the first substrate, elapses. By transferring the first substrate in this manner, any disruption in the wafer processing cycle corresponding to the preset module cycle period, attributable to the processing of the first substrate, can be prevented. Consequently, the batch of substrates can be transferred out of/into a plurality of process modules in any combination with non-conflicting timing from the start to the finish of the processing of the batch of substrates.

The object described above is achieved in another aspect of the present invention by providing a substrate processing system comprising a transfer mechanism that transfers a substrate, at least one process module constituting a first process module set and at least one process module constituting a second process module set both accessible by the transfer mechanism and disposed around the transfer mechanism so as to execute a single series of processing steps or a plurality of processing steps on a batch of substrates sequentially transferred by the transfer mechanism to the first process module set one substrate at a time and to execute a single series of processing steps or a plurality of processing steps on another batch of substrates sequentially transferred to the second process module set one substrate and the time. The substrate processing system includes a control unit that executes processing for setting module cycle periods each corresponding to a process module constituting the first process module set or the second process module set and each representing the sum of a substrate stay time over which a single substrate needs to stay in the process module to undergo processing therein and an attendant busy time during which functions of the process module are engaged on behalf of the substrate before and after the substrate stay time, to uniform time lengths and also executes transfer processing for carrying out a processed substrate and carrying in a substrate to be processed next as a replacement thereof into each module in the first process module set or the second process module set by accessing with the transfer mechanism the various process modules in an order matching the sequence through which the substrate is processed so as to adjust cycles at the individual process modules to the module cycle length having been set.

The substrate processing system according to the present invention described above enables concurrent execution of pipeline processing in two separate systems by using the process modules in the first process module set and the second process module set. More specifically, before the processing of the batch of substrates in each system starts, a uniform module cycle period is set for all the process modules in the first process module set and the second process module set, and thus, the lengths of time (cycles) over which a single substrate undergoes substrate processing in the individual process modules are set equal to one another.

As the processing on the batch of substrates starts in each system, the transfer mechanism executes the following time-share transfer operation. Namely, it accesses the individual process modules in an order matching the sequence with which the individual substrates are processed in each of the first process module set and the second process module set. For instance, the transfer mechanism may access a first process module where the first processing step is executed to carry out a processed substrate and carry in an unprocessed substrate as a replacement thereof. Then, it may access a second process module where the second processing step is executed to carry out a processed substrate and carry in the substrate having undergone the first processing step and taken out of the first process module earlier.

This transfer processing is executed by assuring that the processing cycles at the individual process modules conform to the uniform module cycle period. As a result, regardless of specific details of the processing executed on substrates in the individual process modules (e.g., processing types and the lengths of time required for the actual processing). As a result, regardless of whether the processing is being executed in the first process module set or the second process module set, the substrates can be carried out of/into the individual process modules with uniform transfer cycles. As a result, by offsetting the process cycles corresponding to the individual process modules in the first process module set and the second process module set, the substrates can be carried out of/into a plurality of process modules in any combination with non-conflicting timing.

In addition, the plurality of process modules should be disposed around the transfer mechanism in an order matching the sequence with which the individual substrates are processed. For instance, when substrates transferred through the transfer processing according to the present invention described above undergo a first processing step executed in a first process module disposed on the upstream side of the processing flow and then a second processing step executed in a second process module disposed on a side further downstream relative to the first process module, the second step executed in the second process module should be completed and the substrate stay time in the second process module should end almost simultaneously with or immediately after the substrate having undergone the first processing step is carried out of the first process module. Then, the substrate having undergone the second processing step executed in the second process module should be carried out and the substrate having undergone the first processing step should be carried into the second process module as a replacement.

By disposing the plurality of process modules in the order matching the substrate processing sequence as in the present invention, the first process module and the second process module mentioned above, for instance, are set side-by-side so as to minimize the stroke of the transfer mechanism needed to transfer the substrate having undergone the first processing step in the first process module into the second process module and also minimize the length of time over which the substrate having undergone the first processing step and having been taken out of the first process module needs to be held in standby. As a result, a further improvement in the throughput is achieved.

In addition, the transfer mechanism includes two transfer arms that are able to move into/out of each of the process modules so that a processed substrate is carried out by one of the transfer arms (pick operation) and the substrate to undergo the processing next is carried in by the other transfer arm (place operation) during a single access of the transfer mechanism to the process module. Through such a pick and place operation, the processed substrate can be quickly exchanged with another substrate to undergo the processing next, which further improves the efficiency of the transfer processing according to the present invention described above.

In addition, the plurality of process modules may each include a vacuum chamber, the transfer mechanism may be installed inside a vacuum transfer chamber to which the individual process modules are connected each via a gate valve, and the transfer mechanism may thus transfer individual substrates within a vacuum environment. By adopting this structure, continuous in-line processing can be executed within a vacuum environment.

Also, at least one of the process modules should be, for instance, a film formation processing device that forms a thin film on substrates. In addition, a load-lock module, for instance, should be connected to the vacuum transfer chamber via a gate valve. As an unprocessed substrate taken out from, for instance, a cassette at atmosphere-side pressure is carried into the load-lock module at atmosphere-side pressure in this substrate processing system, the load-lock module is switched from atmosphere-side pressure to the vacuum-side pressure and the unprocessed substrate is transferred to a specific process module by the transfer mechanism via the vacuum transfer chamber at the vacuum-side pressure. Then, as the processed substrate having undergone the series of processing in the individual process modules is returned to the load-lock module, the load-lock module is switched from the vacuum-side pressure to the atmosphere-side pressure and the processed substrate having undergone the series of processing is carried out of the load-lock module by the transfer mechanism and returned to, for instance, the cassette described above.

The object described above is also achieved in yet another aspect of the present invention by providing a substrate processing program to be adopted in a substrate processing system comprising a transfer mechanism that transfers a substrate and a plurality of process modules accessible by the transfer mechanism disposed around the transfer mechanism so as to execute a series of processing on each of a batch of substrates sequentially transferred to the plurality of process modules by the transfer mechanism one substrate at a time. The substrate processing program enables a computer to execute a step for calculating a total length of required time to process a single substrate in correspondence to each process module based upon recipe information stored in a storage medium and related to the processing executed in the process module by adding together the length of time required to process a single substrate, the lengths of time required to transfer the substrate into/out of the process module, and the length of time required to execute post-processing if there is any post processing to be executed immediately after the substrate is carried out, all set in the recipe information in correspondence to the process module, a step for selecting as a module cycle period the greatest total length of required time among the total lengths of required time having been calculated in correspondence to the individual process modules, a step for setting a wait time to elapse in each process module prior to or following the processing time, during which the substrate is kept in standby, and a step for carrying out a processed substrate and carrying in a substrate to be processed next as a replacement by engaging the transfer mechanism to access each of the process modules in an order matching the sequence with which the substrate is processed so as to set a cycle in each process module equal to the module cycle period.

DETAILED DESCRIPTION OF THE PREFERRED EMBODIMENTS

Figure 1:
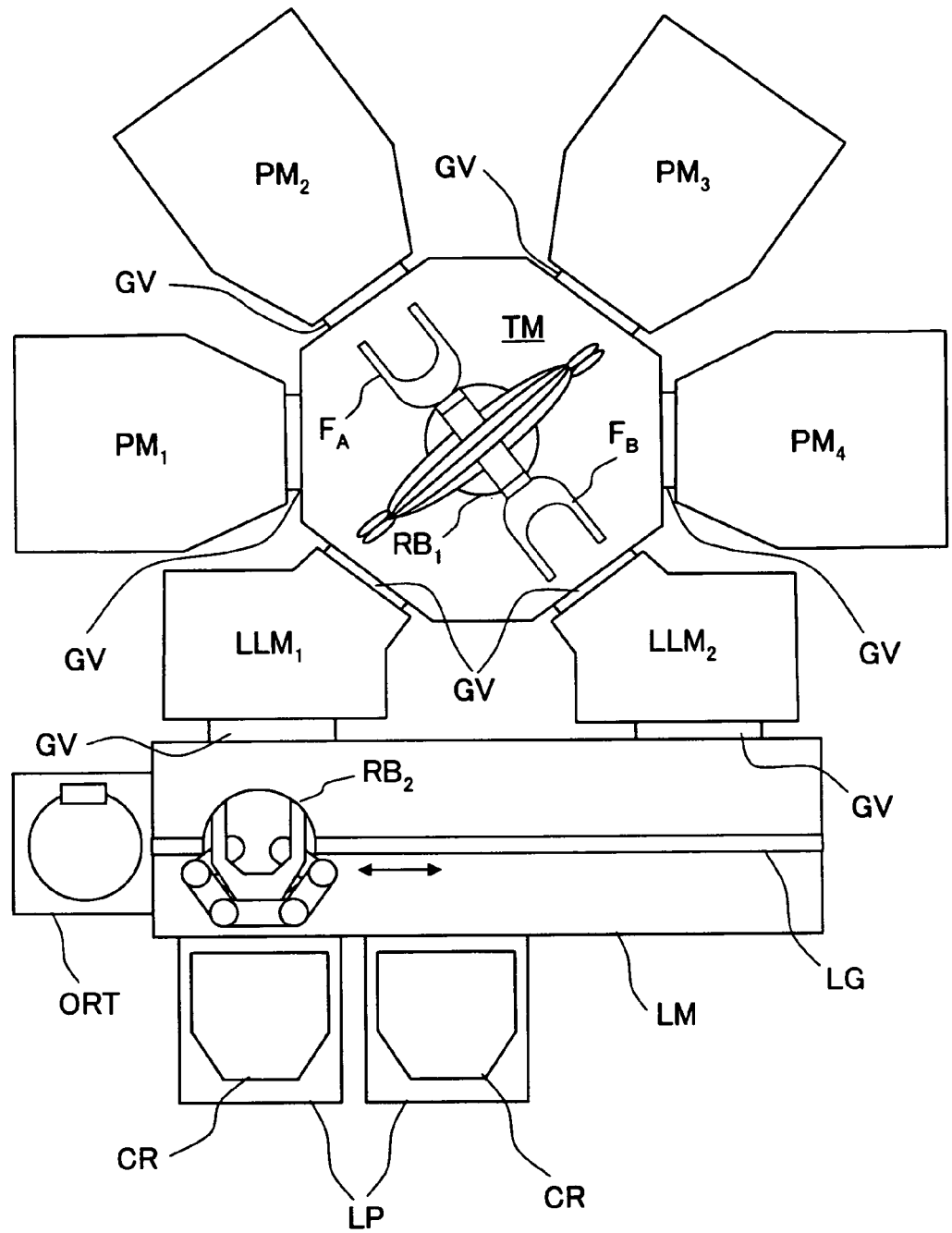
FIG. 1 schematically shows the structure adopted in the substrate processing system achieved in a first embodiment of the present invention.

The following is a detailed explanation of the preferred embodiments of the present invention, given in reference to the attached drawings. It is to be noted that in the specification and the drawings, the same reference numerals are assigned to components having substantially identical functions and structural features to preclude the necessity for a repeated explanation thereof.

Substrate Processing System Achieved in the First Embodiment

First, the substrate processing system achieved in the first embodiment of the present invention is explained in reference to drawings. FIG. 1 schematically shows the structure adopted in the substrate processing system achieved in the first embodiment. This substrate processing system includes a cluster tool (multichamber apparatus) achieved by connecting a plurality (e.g., four) of process modules (processing devices) $PM_1$, $PM_2$, $PM_3$ and $PM_4$ and two load-lock modules (load-lock chambers) $LLM_1$ and $LLM_2$ around a transfer module (vacuum transfer chamber) TM. The transfer module TM disposed at a substantial center of the cluster tool is connected with the individual modules $PM_1$, $PM_2$, $PM_3$, $PM_4$, $LLM_1$ and $LLM_2$ via gate valves GV each of which can be opened/closed freely.

The process modules each include a processing chamber (or a vacuum chamber) in which the pressure can be reduced to achieve a desired degree of vacuum. It is to be noted that the transfer module (vacuum transfer chamber) TM constitutes a common transfer chamber through which wafers are transferred out of of/into the processing chambers at the individual process modules $PM_1$, $PM_2$, $PM_3$ and $PM_4$.

Inside the vacuum transfer chamber constituted with the transfer module TM, a vacuum pressure-side transfer robot $RB_1$ equipped with a pair of transfer arms $F_A$ and $F_B$ capable of making a rotating movement and an expanding/contracting movement is installed. The pair of transfer arms $F_A$ and $F_B$ of the vacuum pressure-side transfer robot $RB_1$ each include a fork-shaped end effector (hereafter may also be referred to as a "pick") on which a single substrate such as a semiconductor wafer (hereafter may be simply referred to as a "wafer") can be held.

The vacuum pressure-side transfer robot $RB_1$ accesses the individual modules $PM_1$, $PM_2$, $PM_3$, $PM_4$, $LLM_1$ and $LLM_2$ in order to carry in/out wafers. Such a vacuum pressure-side transfer robot $RB_1$ includes a base rotatably disposed inside, for instance, the common transfer chamber, with the transfer arms $F_A$ and $F_B$ mounted side-by-side on the base so as to extend/contract along directions opposite from each other. Thus, the transfer arms $F_A$ and $F_B$ are able to rotate as an integrated unit via the base.

When carrying in/out a wafer at one of the modules $PM_1$, $PM_2$, $PM_3$, $PM_4$, $LLM_1$ and $LLM_2$ the transfer arms $F_A$ and $F_B$ are first rotated to turn the pick of either the transfer arm $F_A$ or the transfer arm $F_B$ toward the module to be accessed. Then, as the transfer arm is engaged in an expanding/contracting operation, the pick enters and exits the accessed target module via the gate valve GV to carry a wafer in or out.

In the process modules $PM_1$, $PM_2$, $PM_3$ and $PM_4$, specific types of wafer processing (recipe processes executed based upon process recipes such as a film forming process achieved through CVD or sputtering, a heat treatment and a dry etching process) are executed under specific process conditions (gas types, chamber internal pressures, levels of applied power, lengths of processing time, etc.) in conformance to the process recipes set in advance for the individual chambers. In addition, the load-lock modules $LLM_1$ and $LLM_2$ may each include a heating unit or a cooling unit as necessary.

The load-lock modules $LLM_1$ and $LLM_2$ are connected to a loader module LM via gate valves GV on the side opposite from the side where they are connected with the transfer module TM. The loader module LM is at atmosphere-side pressure at all times and wafers are transferred into the substrate processing system from the outside and are transferred out of the substrate processing system to the outside at this pressure. In addition, load ports LP and an orientation flat alignment mechanism ORT are connected to the loader module LM. A wafer cassette CR containing a batch of wafers (a single lot of wafers (e.g., 25 wafers) is loaded into each load port LP. The load ports are used when moving a wafer cassette CR from, for instance, an outside carrier vehicle and moving a wafer cassette CR to the outside carrier vehicle. It is to be noted that a wafer cassette may instead be loaded at a load port LP by, for instance, an operator. The orientation flat alignment mechanism ORT is used to align a wafer at a specific position or along a specific direction based upon the results of a detection executed to detect an orientation flat or a notch at the wafer.

An atmospheric pressure-side transfer robot $RB_2$ installed within the loader module LM includes transfer arms that are capable of making expanding/contracting movement. The atmospheric pressure-side transfer robot is allowed to move along the horizontal direction on a linear guide (linear slider) LG, and it is also capable of moving up/down and making rotating movement. The atmospheric pressure-side transfer robot $RB_2$ transfers a single wafer or a single unit of wafers from/to a load port LP, the orientation flat alignment mechanism ORT and load-lock modules $LLM_1$ or $LLM_2$. It is to be noted that the linear guide LG is constituted with, for instance, a permanent magnet, a drive exciting coil or a scale head. The linear guide LG controls the horizontal movement, the vertical movement and the rotating movement of the transfer robot $RB_2$ in response to commands issued by, for instance, a host controller.

(Wafer Transfer Sequence)

Now, the basic wafer transfer sequence adopted when executing a series of processing on one of the wafers from the wafer cassette CR loaded at the load port LP in the cluster tool described above is explained.

First, the transfer robot $RB_2$ in the loader module LM takes out a single wafer $W_S$ from the wafer cassette CR on the load port LP and carries the wafer $W_S$ to the orientation flat alignment mechanism ORT. At the orientation flat alignment mechanism ORT, the wafer $W_S$ undergoes an orientation flat alignment.

Once the orientation flat alignment for the wafer $W_S$ is completed, the wafer $W_S$ is taken out of the orientation flat mechanism ORT by the transfer robot $RB_2$ in the loader module LM and is transferred to either the load-lock module $LLM_1$ or the load-lock module $LLM_2$. The wafer $W_S$ is transferred to, for instance, the load-lock module $LLM_1$ from the loader module LM, with internal space at the recipient load-lock module $LLM_1$ at atmosphere-side pressure. Then, as the wafer is carried into the load-lock module $LLM_1$, the load-lock module $LLM_1$, is evacuated and thus, the load-lock module $LLM_1$, is depressurized. In this state, the wafer $W_S$ is transferred from the loader module LM side into the transfer module TM by the vacuum pressure-side transfer robot $RB_1$.

During this operation, the wafer $W_S$ is picked out of the load-lock module $LLM_1$ and is carried into a first process module, e.g., the process module $PM_1$, by either of the transfer arms $F_A$ and $F_B$ of the transfer robot $RB_1$. Once the wafer is placed in the process module $PM_1$, it undergoes a first processing step under specific process conditions (a specific gas type, a specific chamber internal pressure, a specific level of applied power, a specific length of processing time, etc.) in conformance to the preset process recipe. Post-processing such as purging or evacuation may be executed at the process module $PM_1$ immediately after the processed wafer $W_S$ is carried out.

Following the first processing step or the post-processing at the process module $PM_1$, the wafer $W_S$ is carried out of the process module $PM_1$ and transferred into a second process module (e.g., $PM_2$) by the transfer robot $RB_1$. Once the wafer is placed in the second process module $PM_2$, it undergoes a second processing step under specific process conditions (a specific gas type, a specific chamber internal pressure, a specific level of applied power, a specific length of processing time, etc.) in conformance to the preset process recipe. Post-processing such as purging or evacuation may also be executed at the second process module $PM_2$ immediately after the processed wafer $W_S$ is carried out.

Following the second processing step or the post-processing at the process module $PM_2$, the wafer $W_S$ is carried out of the second process module $PM_2$ and if it is to undergo further processing, it is carried into the next process module (e.g., the process module $PM_3$ or the process module $PM_4$) to be processed in the next processing step by the transfer robot $RB_1$. Once all the processing is completed, the wafer $W_S$ is returned to either the load-lock module $LLM_1$ or the load-lock module $LLM_2$.

In addition, if the wafer $W_S$ is to undergo even further processing after the subsequent processing step is completed in the third process module or a subsequent process module, the wafer $W_S$ is moved into the process module where it is to undergo the further processing step. Once the wafer $W_S$ undergoes all the processing steps, it is returned into either the load-lock module $LLM_1$ or the load-lock module $LLM_2$. It is to be noted that post-processing such as purging or evacuation may also be executed at the third or subsequent process module PM immediately after the processed wafer $W_S$ is carried out, as in the first and second process modules $PM_1$ and $PM_2$.

As the wafer $W_S$ having undergone the series of processing steps executed in the plurality of process modules $PM_1$, $PM_2$, . . . at the multichamber apparatus (cluster tool) is carried into, for instance, the load-lock module $LLM_2$, the load-lock module $LLM_2$ is switched from the low pressure state to the atmospheric pressure state. Then, the wafer $W_S$ is taken out of the load-lock module $LLM_2$ at atmosphere-side pressure and is returned to the wafer cassette CR where it was initially stored by the transfer robot $RB_2$ at the loader module LM.

It is to be noted that if the load-lock modules $LLM_1$ and $LLM_2$ each include a heating unit or a cooling unit, the wafer $W_S$ present in the load-lock module $LLM_1$ or $LLM_2$ can be heated or cooled in a desired environment by controlling the heating unit or the cooling unit.

In the cluster tool described above, a wafer can be transferred sequentially to a plurality of process modules while sustaining the vacuum-side pressure so as to continuously execute a series of processes on the wafer. In particular, different types of film forming processes can be continuously executed in a plurality of process modules through vacuum thin-film formation and thus, desired types of thin films can be formed and layered in-line on the wafer. In addition, since the individual processing steps can be continuously executed in the plurality of process modules by adopting, for instance, a pipeline system, the operation rate and the productivity can both be improved.

During the transfer sequence described above, the wafer transfer in the cluster tool (multichamber apparatus) is exclusively carried out by the single transfer robot $RB_1$ installed in the transfer module TM. For this reason, wafers cannot be carried out of/into a plurality of process modules simultaneously.

Accordingly, if the timing with which a wafer should be carried into/out of a given process module conflicts with the timing with which a wafer should be carried into/out of another process module, separate wafer transfer processing will have to be executed for each process module. This is bound to create a wasteful wait time at the process module for which the wafer transfer processing is executed later. If a wasteful wait time occurs in one process module, the operations at the other process modules, too, will be adversely affected, e.g., the interval to elapse before the next access to the process module for which the wafer transfer processing has been executed first will increase. As a result, the transfer efficiency and the operation rate in the entire substrate processing system will become poorer.

As a solution, wafers are transferred into/out of the plurality of process modules with non-conflicting timing as detailed later in the cluster tool (multichamber apparatus) so as to reduce the cycle over which the transfer robot $RB_1$ accesses each process module and the cycle of the processing (single wafer processing) executed to process a single wafer in each process module in the embodiment. Consequently, the transfer efficiency and the operation rate of the overall system are improved, which, ultimately achieves an improvement in throughput.

Since wafers can be carried out of/into the plurality of process modules with non-conflicting timing in the cluster tool (multichamber apparatus) achieved in the embodiment as described above, a pick and place operation can be executed to carry out a processed wafer from a given process module and carry the next wafer to undergo the processing into the same process module as a replacement through a single access to the process module by the transfer robot $RB_1$.

(Pick and Place Operation)

Now, in reference to FIG. 2, the pick and place operation (wafer exchange operation) executed by the transfer robot $RB_1$ is explained. In the following explanation, the individual process modules $PM_1$ through $PM_4$ are collectively referred to as a process module $PM_n$ (n=1, 2, 3, 4).

Figure 2A:
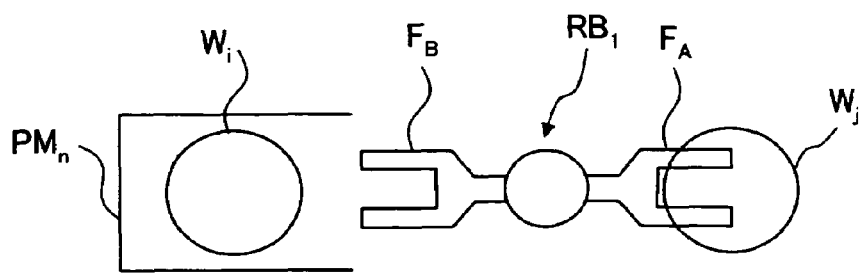
FIGS. 2A, 2B, 2C, 2D, 2E and 2F are schematic diagrams illustrating the pick and place operation executed in the embodiment.

First, one of the transfer arms (e.g., the transfer arm $F_A$) of the transfer robot $RB_1$ is engaged to hold a wafer $W_j$ to be carried into the process module $PM_n$ (e.g., an unprocessed wafer that has not yet undergone any processing steps, or a pre-process wafer that has undergone processing up to the immediately preceding step but is yet to undergo the processing step in the process module $PM_n$). At this time, the other transfer arm $F_B$ is left in a wafer-free state. The transfer arms $F_A$ and $F_B$ are rotated in this state to set the other transfer arm $F_B$ facing opposite the process module $PM_n$ as shown in FIG. 2A.

Figure 2B:
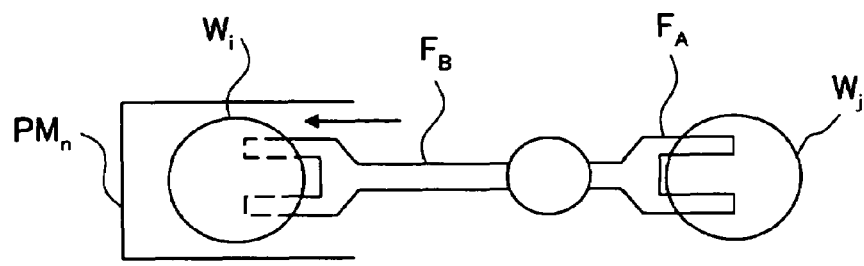
Figure 2C:
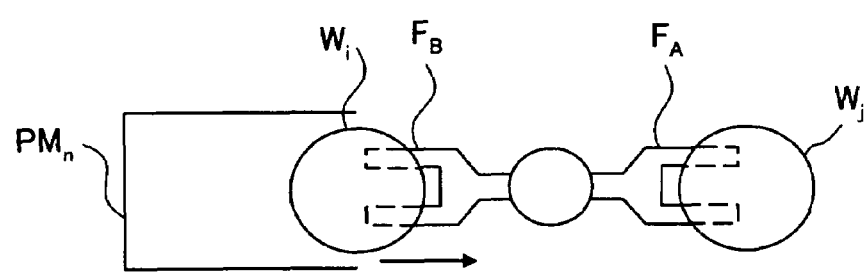
Figure 2D:
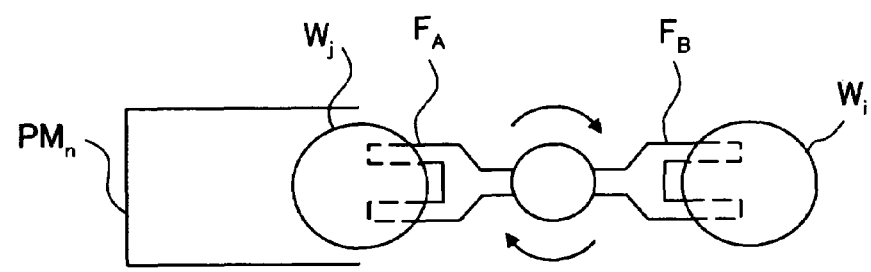
Figure 2E:
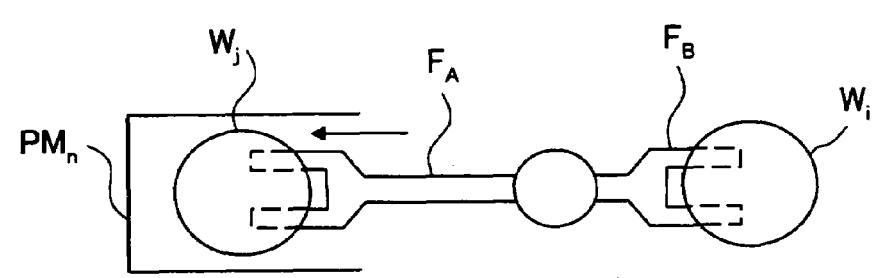
Figure 2F:
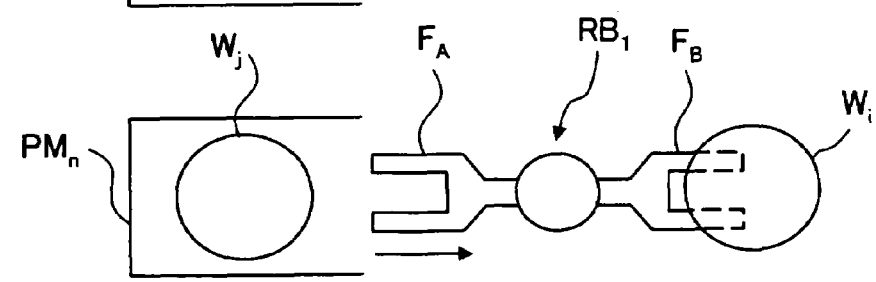

Next, as shown in FIGS. 2B and 2C, the other free transfer arm $F_B$ (in the wafer-free state) is inserted inside the chamber at the process module $PM_n$ to take out a processed wafer $W_i$ (pick operation). Then, as shown in FIG. 2D, the transfer arms $F_A$ and $F_B$ are rotated (reversed) by 180° so as to set the transfer arm $F_A$ holding the pre-process (or unprocessed) wafer $W_j$ facing opposite the process module $PM_n$. Subsequently, as shown in FIGS. 2E and 2F, the transfer arm $F_A$ is inserted through the chamber of the process module $PM_n$ to transfer the wafer $W_j$ onto a stage (or a support pin or the like) disposed inside the chamber and then the now-free transfer arm $F_A$ is pulled out of the chamber (place operation). The processed wafer $W_i$ is thus exchanged with the pre-process wafer $W_j$. It is to be noted that this pick and place operation is executed while the gate valve GV (see FIG. 1) at the process module $PM_n$ is left open.

As described above, the transfer robot $RB_1$ in the transfer module TM is able to replace the processed wafer $W_i$ with the pre-process (or unprocessed) wafer $W_j$ to undergo the processing next through the pick and place operation described above, by accessing each process module $PM_n$ only once.

The transfer robot $RB_1$ is also capable of replacing a processed wafer $W_i$ with a pre-process (or unprocessed) wafer $W_j$ or transferring the individual wafers $W_i$ and $W_j$ by executing a similar pick and place operation at the load-lock module $LLM_1$ or $LLM_2$ also through a single access. It is to be noted that during a single access to a given module, the place operation may be executed immediately following the pick operation or the place operation may be executed by allowing a slight wait time to elapse following the pick operation. In addition, a pick operation alone may be executed simply to carry out a processed wafer $W_i$, or a place operation alone may be executed to carry a pre-process wafer (or an unprocessed wafer) $W_j$ into the module.

Wafer Processing Executed in the Embodiment

Figure 3:
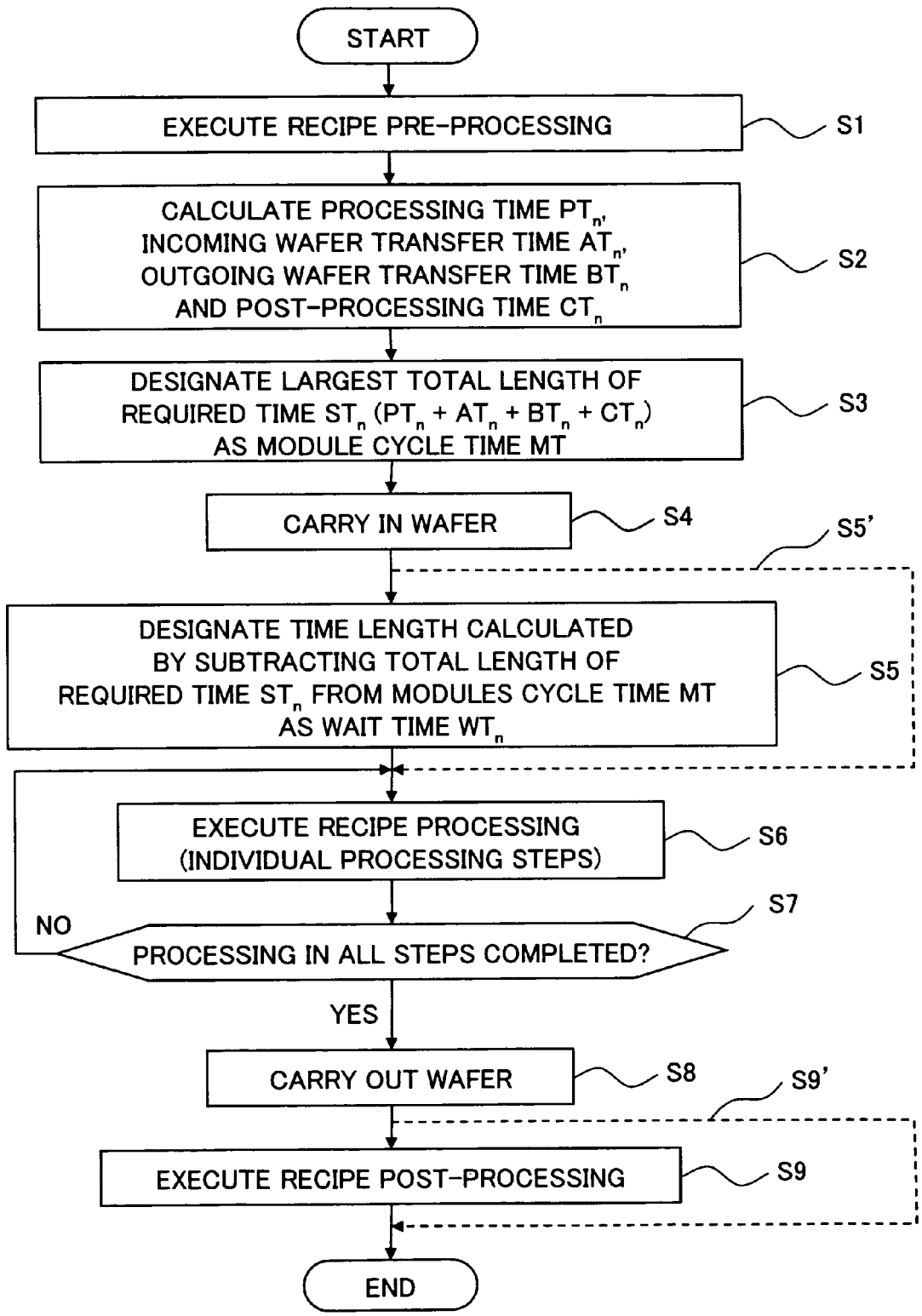
FIG. 3 presents a flowchart of the substrate processing executed in the embodiment.

Next, the wafer processing executed in the substrate processing system achieved in the embodiment is explained in reference to drawings. FIG. 3 presents a flowchart of the procedure of the processing executed on wafers in the individual process modules $PM_n$ based upon the substrate processing program achieved in the embodiment. This processing is executed in response to a written to be stark request issued by the control unit (not shown) that executes overall control for the substrate processing system and individual control on the various units constituting the system. More specifically, the processing is executed in conformance to a specific program, based upon the process recipes explained earlier. It is to be noted that the program, the process recipes and the like are stored in a recording medium such as a memory, a hard disk a CD-ROM or a floppy disk constituting part of the substrate processing system. The process recipes are stored as recipe information in, for instance, a control job storage area in the storage medium.

The control unit may be constituted with, for instance, a computer (e.g., a personal computer). The control unit executes a substrate processing program such as that described below. This substrate processing program is used to execute processing for setting a uniform module cycle period for the individual modules $PM_n$, executing the wafer transfer sequence in correspondence to this module cycle period and processing wafers in the individual process modules accordingly. The substrate processing program is stored and saved in a recording medium such as a memory, a hard disk, a CD-ROM or a floppy disk. The control unit loads the substrate processing program into its main memory in response to an operator instruction.

Now, the wafer processing executed in conformance to the substrate processing program is explained in specific detail. In the explanation, the individual process modules $PM_1$, through $PM_4$ are collectively referred to as a process module $PM_n$ (n=1, 2, 3, 4). First, preliminary processing (recipe preliminary processing) is executed in step S1. Namely, during the preliminary processing, various settings such as process parameters set in advance and the functions of various units included in the system are all initialized.

Next, the length of time required for processing $PT_n$, the length of time required for transferring an incoming wafer $AT_n$, the length of time required to transfer an outgoing wafer $BT_n$ and the length of time required to execute post-processing $CT_n$ set in the process recipe corresponding to each process module $PM_n$ are all determined through calculation in advance, before the wafer processing actually starts.

The length of processing time $PT_n$ represents the length of time required to execute the recipe processing on a single wafer in the process module $PM_n$. If the recipe processing includes numerous steps, the length of processing time $PT_n$ represents the sum obtained by totaling the lengths of time required to execute the individual steps. It is to be noted that the processing time $PT_n$ is the minimum length of time over which a single wafer undergoing the recipe processing needs to stay inside the process module $PM_n$.

The length of incoming wafer transfer time $AT_n$ represents the length of time required by the transfer robot $RB_1$ at the transfer module TM to carry a wafer into the process module $PM_n$. The incoming wafer transfer time $AT_n$ includes the length of time over which the transfer arms $F_A$ and $F_B$ of the transfer robot $RB_1$ need to be engaged in rotating and expanding/contracting operations and the length of time required to open/close the gate valve GV.

The length of outgoing wafer transfer time $BT_n$ represents the length of time required by the transfer robot $RB_1$ at the transfer module TM to carry a wafer out of the process module $PM_n$. The outgoing wafer transfer time $BT_n$ includes the length of time over which the transfer arms $F_A$ and $F_B$ of the transfer robot $RB_1$ need to be engaged in rotating and expanding/contracting operations and the length of time required to open/close the gate valve GV.

The length of time required to execute the post-processing $CT_n$ represents the length of time required to execute post-processing (e.g., purging, evacuation or the like) in order to adjust (or reset) the state of the process module $PM_n$ in most cases or the environment in the processing chamber at the process module $PM_n$ including the pressure level in the processing chamber, immediately after a processed wafer is carried out of the process module $PM_n$.

Next, in step S3, a module cycle period MT is determined. In more specific terms, based upon global data (data on the collective body of a plurality of process recipes based upon which a single wafer is processed) on the process recipes corresponding to the individual process modules, the greatest total length of required time ST(MAX) corresponding to a specific process module in which a single wafer is processed over the greatest total length of time $ST_n$ ($ST_n$=recipe processing time $PT_n$+incoming wafer transfer time $AT_n$+outgoing wafer transfer time $BT_n$+post-processing time $CT_n$) among all the process modules is determined. Then, this maximum total length of required time ST(MAX) is designated as the module cycle period MT.

Thus, the module cycle period MT in the cluster tool is set to a cycle equal to the largest value among the total length of required time $ST_1$, $ST_2$ . . . per wafer, calculated for all the process modules $PM_1$, $PM_2$, . . . that are engaged in operation simultaneously in the substrate processing system. In each total length of required time $ST_n$, the incoming wafer transfer time $AT_n$, the outgoing wafer transfer time $BT_n$ and the post-processing time $CT_n$ are periods during which functions of the process module $PM_n$ are engaged to carry in a wafer, carry out a wafer and execute post-processing on a wafer before or after the recipe processing time $PT_n$, and their sum represents an attendant busy time during which another wafer cannot be transferred into the process module $PM_n$.

In the following step S4 and subsequent steps, a wafer is carried into the process module $PM_n$ and undergoes the recipe processing. Namely, the wafer is carried into the process module $PM_n$ in step S4, and the length of time (time difference) obtained by subtracting the total length of required time $ST_n$ corresponding to the process module $PM_n$ from the module cycle period MT is designated as a wait time $WT_n$ for the process module $PM_n$ in step S5.

Next, when the wait time $WT_n$ is up following the incoming wafer transfer, the recipe processing is executed (if there are a plurality of steps to be executed, the individual processing steps are executed) in step S6. It is to be noted that if the module cycle period MT and the total length of required time corresponding to the particular process module $PM_n$ are equal to each other, i.e., if the total length of required time $ST_n$ for the particular process module $PM_n$ is the greatest total length of required time ST(MAX) among all the process modules, the recipe processing corresponding to the process recipe starts immediately without allowing any wait time (steps S5' and S6).

Next, a decision is made in step S 7 as to whether or not all the steps of the recipe processing have been completed based upon the process recipe. If it is decided in step S7 that all the steps of the recipe processing have been completed, the wafer is carried out in step S8. If it is necessary to execute post-processing (recipe post-processing), the post-processing is executed in step S9 immediately after the wafer is carried out and thus, a session of wafer processing ends. It is to be noted that if no post-processing needs to be executed, the session of single wafer processing ends when the wafer is carried out in step S9'.

FIG. 4 presents a specific examples of what may occur in different process modules $PM_n$ over the duration of the module cycle period MT (cycle make-ups). In the embodiment, a uniform (or common) module cycle period MT is set for a group of process modules engaged in concurrent operations. FIG. 4 presents specific examples in which the process modules $PM_1$, $PM_2$, . . . are engaged in concurrent operations.

Figure 4A:
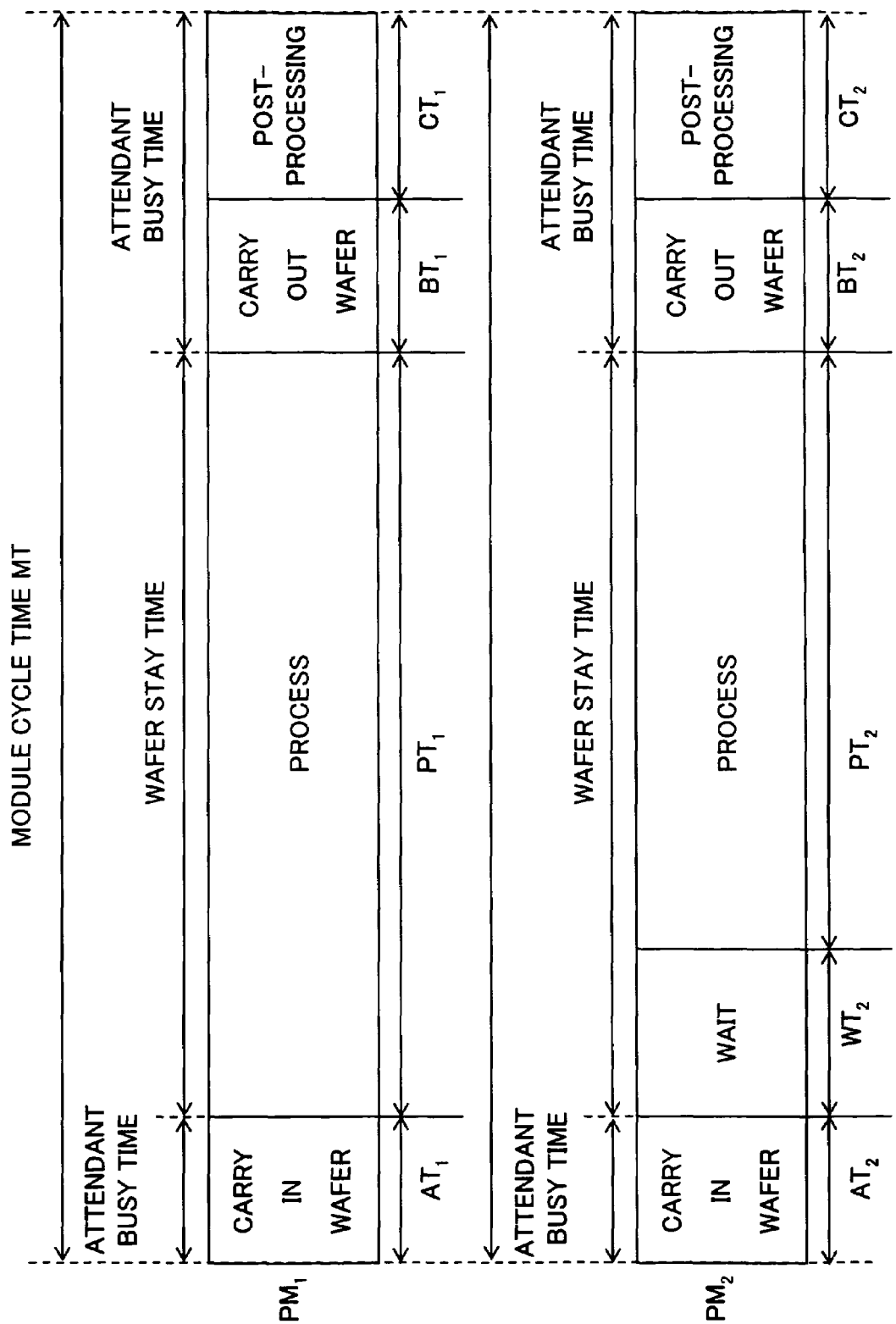
FIG. 4A presents an example of different set ups of the module cycle period that may be set in the embodiment.

In FIG. 4A, the total length of required time $ST_1$ per wafer at the process module $PM_1$ where post-processing needs to be executed ($ST_1$=incoming wafer transfer time $AT_1$+processing time $PT_1$+outgoing wafer transfer time $BT_1$+post-processing time $CT_1$) is the greatest total length of required time ST(MAX), i.e., $ST_1$=MT. In this situation, after a wafer is carried into the process module $PM_1$, the recipe processing (over the processing time $PT_1$) set in the process recipe is started immediately without allowing any wait time to elapse. Once all the steps of the recipe processing are completed, the wafer is immediately carried out without allowing any wait time to elapse, and then the post-processing is executed.

In another process module such as the process module $PM_2$ where post-processing needs to be executed, a wait time $WT_2$ elapses after a wafer is carried in and the recipe processing (executed over the processing time $PT_2$) set in the corresponding process recipe is started when the wait time is up. Then, as the recipe processing is completed, the wafer is carried out immediately and the post-processing is executed. It is to be noted that the length of wait time $WT_2$ is calculated as $WT_2$=MT−$ST_2$.

Figure 4B:
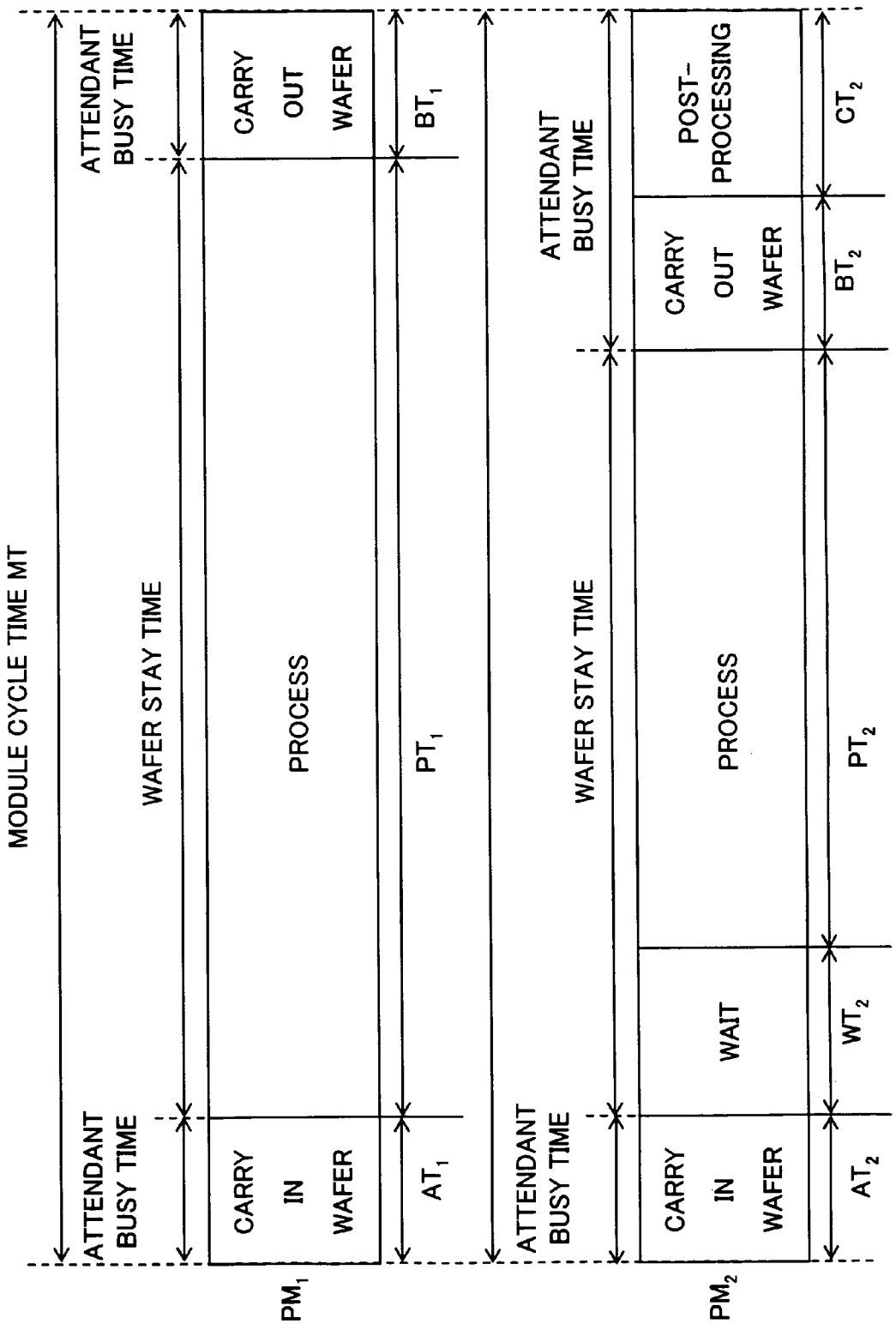
FIG. 4B presents an example of different set ups of the module cycle period that may be set in the embodiment.

In FIG. 4B, the total length of required time $ST_1$ per wafer at the process module $PM_1$ where no post-processing needs to be executed ($ST_1$=incoming wafer transfer time $AT_1$+processing time $PT_1$+outgoing wafer transfer time $BT_1$) is the greatest-total length of required time ST(MAX), i.e., $ST_1$=MT. In this situation, too, after a wafer is carried into the process module $PM_1$, the recipe processing (over the processing time $PT_1$ set in the process recipe is started immediately without allowing any wait time to elapse. Once all the steps of the recipe processing are completed, the wafer is immediately carried out without allowing any wait time to elapse.

In the other process module such as the process module $PM_2$ where post-processing needs to be executed, a wait time $WT_2$ ($WT_2$=MT−$ST_2$) elapses after a wafer is carried in and the recipe processing (executed over the processing time $PT_2$) set in the corresponding process recipe is started when the wait time is up. Then, as all the steps of the recipe processing are completed, the wafer is carried out immediately and the post-processing is executed.

Figure 4C:
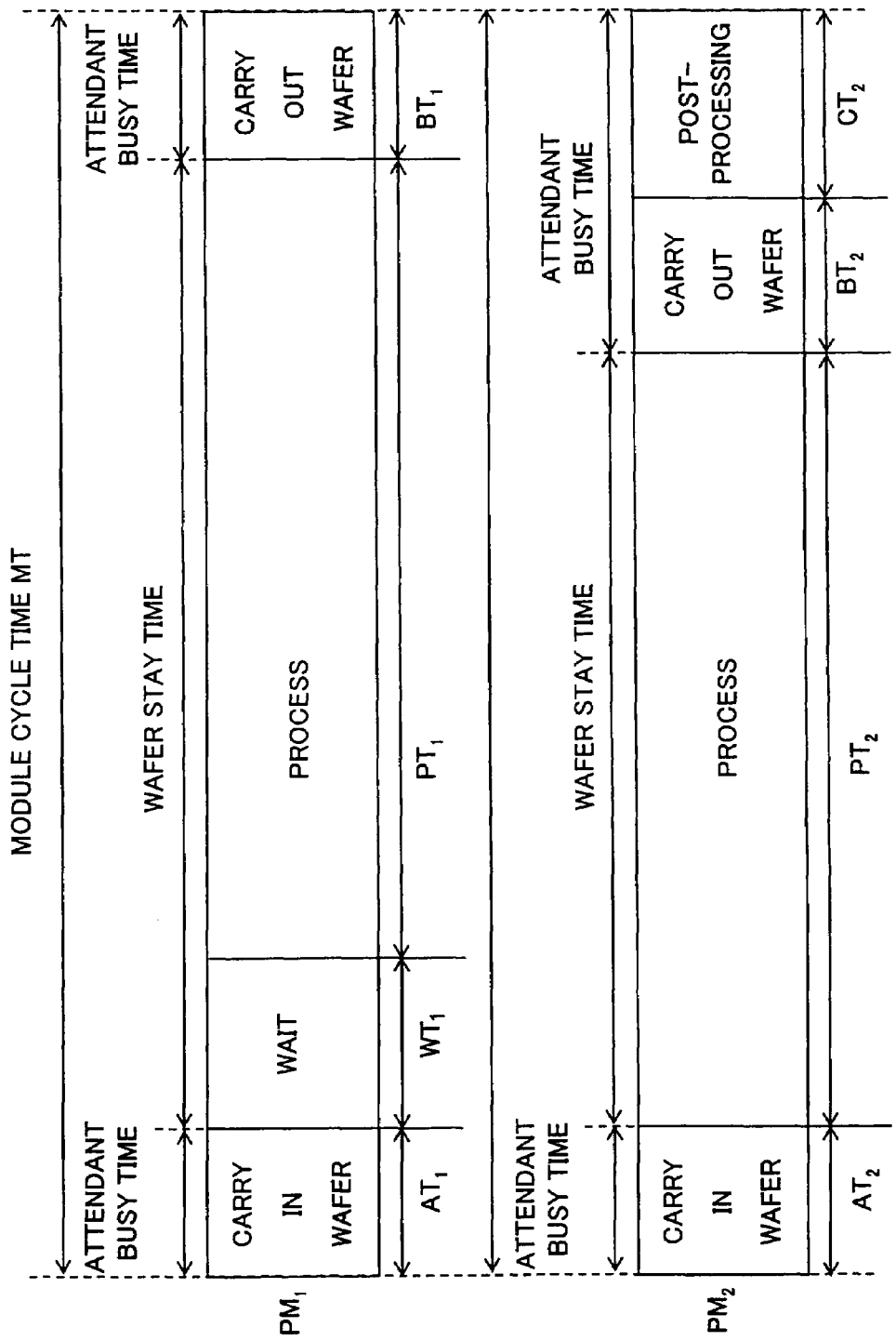
FIG. 4C presents an example of different set ups of the module cycle period that may be set in the embodiment.

In FIG. 4C, the total length of required time $ST_2$ at the process module $PM_2$ where post-processing needs to be executed ($ST_2$=incoming wafer transfer time $AT_2$+processing time $PT_2$+outgoing wafer transfer time $BT_2$+post-processing time $CT_2$) is the greatest total length of required time ST(MAX), i.e., $ST_2$=MT.

In this situation, at the process module $PM_1$ where no post-processing needs to be executed, for instance, a wait time $WT_1$ ($WT_1$=MT−$ST_1$) elapses after a wafer is carried into the process module $PM_1$ and then the recipe processing (executed over the processing time $PT_1$) set in the process recipe starts. Once all the steps in the recipe processing are completed, the wafer is immediately carried out of the process module $PM_1$.

At the process module $PM_2$, the recipe processing (executed over the processing time $PT_2$) set in the process recipe is started immediately without allowing any wait time to elapse after a wafer is carried in. Then, as all the steps in the recipe processing are completed, the wafer is carried out immediately without allowing any wait time to elapse, and subsequently, the post-processing is executed.

First Implementation Example of the Transfer Sequence

Figure 5:
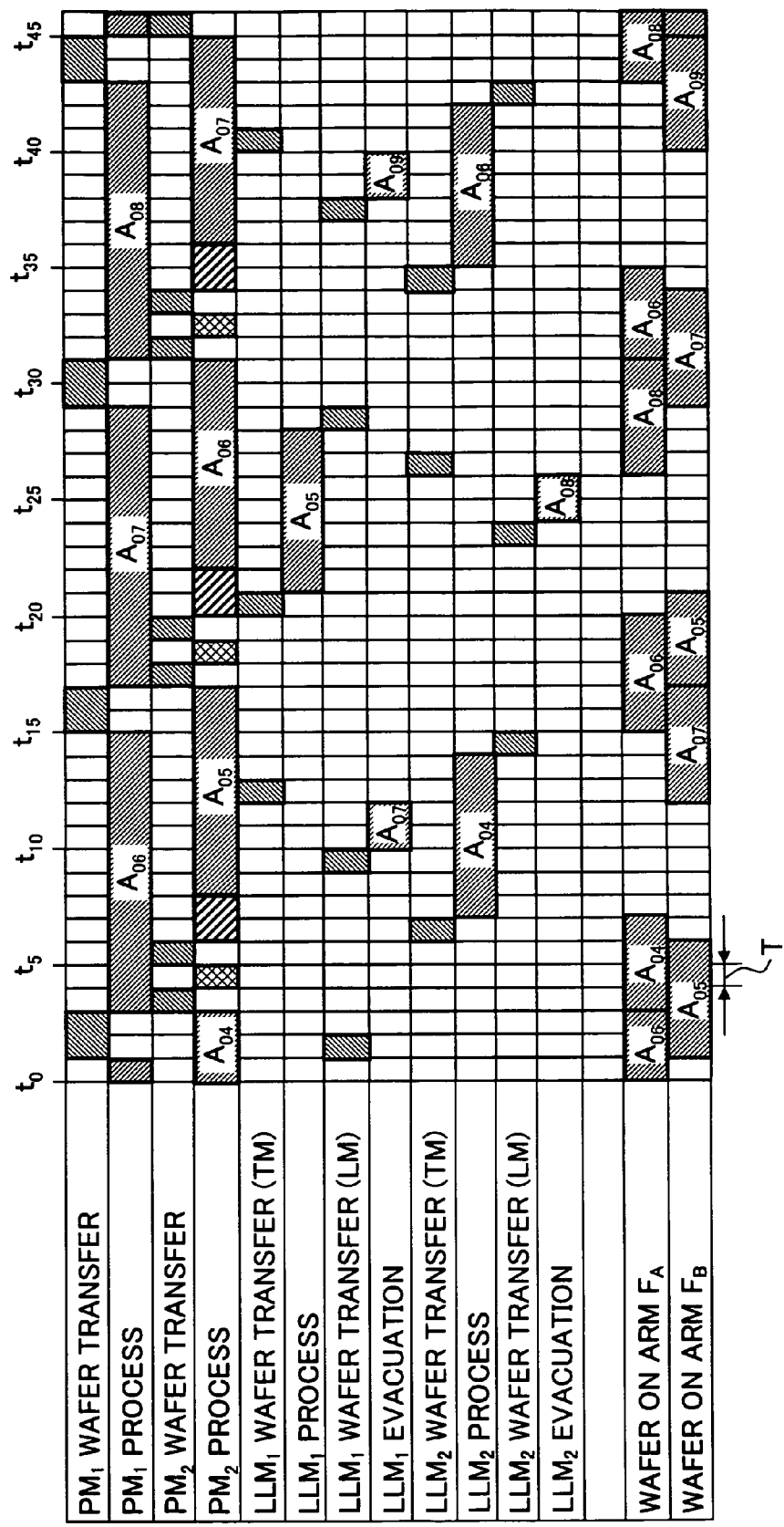
FIG. 5 shows the transfer sequence executed in a first implementation example of the present invention.

Next, the first implementation example of a transfer sequence that may be executed in conformance to the substrate processing program described above in the substrate processing system achieved in the embodiment is explained. FIG. 5 presents a specific example of the transfer sequence. Through the transfer sequence achieved in the first implementation example, a batch of wafers A (e.g., a predetermined number of wafers $A_{01}$ through $A_{nm}$) corresponding to a single cassette capacity, which have been loaded at a load port LP in the substrate processing system shown in FIG. 1, are sequentially transferred one wafer at the time, to the plurality of process modules $PM_1$ and $PM_2$ and the wafers $A_{01}$ through $A_{nm}$ individually undergo a series of processing.

The shaded areas in FIG. 5 each indicate an active period of time (e.g., a period of time over which a wafer is being transferred during the wafer transfer processing, a period of time during which a wafer is undergoing wafer processing or a period of time over which the process module is being evacuated during evacuation processing) over which processing is executed at a given part of the cluster tool. In other words, the shaded areas each indicate an active period at a given module of the cluster tool. In order to simplify the explanation, the lengths of active periods are indicated in units of rectangular blocks in FIG. 5. The lateral width of a single rectangular block indicates a basic unit time T representing one time block, which lasts over a predetermined length of time (e.g., 8 to 10 sec), and an active period (the time length indicated by the width of the corresponding shaded area) at a given module is indicated as an integral multiple of the basic unit time block T. In addition, $t_0$ in FIG. 5 indicates a given time point taken while continuous processing executed on the batch of wafers $A_{01}$ through $A_{nm}$ is in progress.

The transfer sequence in the first implementation example may be adopted when forming layered films constituted of Ti and TiN at the surfaces of holes and viaducts as a barrier metal through continuous processing (in-line continuous processing) within the cluster tool before embedding a metal such as tungsten in the holes and viaducts formed at, for instance, Si wafers.

More specifically, Ti film formation processing is first executed on the individual wafers $A_{01}$ through $A_{nm}$ in the process module $PM_1$ and then, TiN film formation processing is executed in the process module $PM_2$. It is to be noted that no post-processing is executed in the process module $PM_1$ and that post-processing is executed in the process module $PM_2$ in this example. In addition, the other process modules $PM_3$ and $PM_4$ are not engaged in operation.

Now, the processing executed at, and the active periods occurring at the individual units as shown in FIG. 5 are explained in detail. The active period occurring during the "$PM_1$ wafer transfer" includes the period of time over which the transfer robot $RB_1$ at the transfer module TM accesses the first process module $PM_1$ and executes a transfer operation to replace a processed wafer with a pre-process wafer through the pick and place operation described earlier. The incoming wafer transfer time $AT_1$ and the outgoing wafer transfer time $BT_1$ are each equal to 1 T. It is to be noted that when the first wafer $A_{01}$ among the batch of wafers $A_{01}$ through $A_{nm}$ to undergo the series of processing executed continuously along the same transfer path is carried into the process module $PM_1$, only the place operation is executed, whereas when carrying out the last wafer $A_{nm}$ only the pick operation is executed.

The active period occurring during the "$PM_1$ process" includes the length of time required to form a thin Ti film on the wafer in the process module $PM_1$. The processing time $PT_1$ required for the execution of the thin Ti film formation processing is equivalent to 12 T. It is to be noted that since there is no wait time or occurring during the "$PM_1$ process", $WT_1=0$.

The active period occurring during the "$PM_2$ wafer transfer" includes the period of time over which the transfer robot $RB_1$ at the transfer module TM accesses the process module $PM_2$ and executes a transfer operation to replace a processed wafer with a pre-process wafer through the pick and place operation described earlier. The incoming wafer transfer time $AT_2$ and the outgoing wafer transfer time $BT_2$ are each equal to 1 T. It is to be noted that when the first wafer (leading wafer) among the batch of wafers to undergo the series of processing executed continuously along the same transfer path is carried into the process module $PM_2$, only the place operation is executed, whereas when carrying out the last wafer $A_{nm}$, only the operation is executed in the process module $PM_2$ as is the process module $PM_1$.

The active period occurring during the "$PM_2$ process" includes the length of time required to form a TiN film at the wafer in the process module $PM_2$ and the length of time required to execute the post-processing immediately after the film formation processing. It further includes a wait time which elapses immediately before the TiN film formation processing. The processing time $PT_2$ required to execute the TiN film formation processing is equivalent to 9 T, the length of the wait time $WT_2$ is equivalent to 2 T and the length of the post-processing time $CT_2$ is equivalent to 1 T.

The active periods occurring during the "$LLM_1$ wafer transfer (TM)" and the "$LLM_2$ wafer transfer (TM)" respectively include the lengths of time required by the transfer robot $RB_1$ in the transfer module TM to execute transfer operations to transfer wafers into/out of the load-lock modules $LLM_1$ and $LLM_2$. The active periods corresponding to the $LLM_1$ wafer transfer and the $LLM_2$ wafer transfer each last over 1 T.

The active periods occurring during the "$LLM_1$ process" and the "$LLM_2$ process" respectively include the lengths of time required to heat or cool the wafers during post-processing steps executed in the load-lock modules $LLM_1$ and $LLM_2$ following the film formation processing and the active period elapsing at each LLM for this process also includes the length of time required to switch the environments inside the load-lock modules $LLM_1$ and $LLM_2$ from the low pressure state to the atmosphere-side pressure. The active period occurring at each load-lock module lasts over 7 T.

The active periods occurring during the "$LLM_1$ wafer transfer (LM)" and the "$LLM_2$ wafer transfer (LM)" respectively include the lengths of time required by the transfer robot $RB_2$ at the loader module LM to execute transfer operations to transfer wafers into/out of the load-lock modules $LLM_1$ and $LLM_2$. The active period which is allowed for each load-lock module for this processing lasts over 1 T.

The active periods occurring during the "$LLM_1$ evacuation" and the "$LLM_2$ evacuation" respectively include the lengths of time required to execute evacuation processing to switch the environment in the load-lock modules $LLM_1$ and $LLM_2$ from the atmosphere-side pressure to the low pressure state achieving a desired level of vacuum after wafers are transferred into the load-lock modules $LLM_1$ and $LLM_2$. The active period allowed to elapse at each load-lock module for this processing lasts over 2 T.

The active periods with regard to the "wafer on the arm $F_A$ and the "wafer on the arm $F_B$" each include the length of time over which a wafer is held at the transfer arm $F_A$ or $F_B$ of the transfer robot $RB_1$ in the transfer module TM.

Next, the transfer sequence shown in FIG. 5 is explained in specific detail. In the transfer sequence shown in FIG. 5, the transfer robot $RB_1$ accesses the process module $PM_1$, carries out a processed wafer $A_{05}$ with the transfer arm $F_B$ and carries in a preprocess (or unprocessed) wafer $A_{06}$ with the transfer arm $F_A$ through a pick and place operation, thereby replacing the wafer $A_{05}$ with the wafer $A_{06}$, during the active period elapsing between, for instance, $t_1$ and $t_3$ for the "$PM_1$ wafer transfer".

Immediately after the time point $t_3$ at which the wafer $A_{06}$ is carried into the process module $PM_1$, the processing corresponding to the "$PM_1$ process" i.e., the recipe processing executed on the wafer $A_{06}$ to form the Ti film, is started in the process module $PM_1$.

In the process module $PM_2$, the processing corresponding to the "$PM_2$ process", i.e., the recipe processing for forming the TiN film on a wafer $A_{04}$, has been in progress concurrently during the processing described above. The recipe processing on the wafer $A_{04}$ ends at the time point $t_3$.

Since the "$PM_1$ wafer transfer" processing described above, too, ends at the time point $t_3$, a time period elapsing between $t_3$ and $t_4$ immediately afterwards can be allocated for the "$PM_2$ wafer transfer" processing (the transfer of the outgoing wafer $A_{04}$ in this example). Namely, the vacuum pressure-side transfer robot $RB_1$ carries out the processed wafer $A_{04}$ on its free transfer arm $F_A$ through a pick operation. It is to be noted that during a time period elapsing between $t_4$ and $t_5$ immediately afterwards, post-processing is executed in the now empty process module $PM_2$ following the transfer of the outgoing wafer $A_{04}$.

Then, during a period of time to elapsing between $t_5$ and $t_6$ immediately following the end of the post-processing executed in the process module $PM_2$, the "$PM_2$ wafer transfer" processing is executed (the transfer of the incoming wafer $A_{05}$ in this example). Namely, the transfer robot $RB_1$ carries the wafer $A_{05}$ having been carried out on the transfer arm $F_B$ from the process module $PM_1$ earlier into the process module $PM_2$ through a place operation. The process module $PM_2$ enters a standby state which lasts over a period elapsing between $t_6$ and $t_8$ following the transfer of the incoming wafer $A_{05}$, i.e., the process module $PM_2$ waits in a standby state during the wait time $WT_2$ (2 T) during the "$PM_2$ process". Then, when the wait time $WT_2$ (2 T) has elapsed at the time point $t_8$, the recipe processing for forming the TiN film on the wafer $A_{05}$ starts.

In addition, during a period elapsing between the time points $t_6$ and $t_7$, the "$LLM_2$ wafer transfer (TM)" processing is executed (the transfer of the incoming wafer $A_{04}$ in this example"). Namely, the transfer robot $RB_1$ carries the wafer $A_{04}$ held on its transfer arm $F_A$, which has undergone the Ti film formation processing and the TiN film formation processing, into the load-lock module $LLM_2$. Once the wafer $A_{04}$ is carried into the load-lock module $LLM_2$, the "$LLM_2$ process" processing is executed at the load-lock module $LLM_2$ over a time period elapsing between $t_7$ and $t_{14}$ immediately afterwards.

When the "$LLM_2$ process" processing at the load-lock module $LLM_2$ is completed, the "$LLM_2$ wafer transfer (LM)" processing is executed (the transfer of the outgoing wafer $A_{04}$ in this example) over a time period elapsing between $t_{14}$ and $t_{15}$ immediately afterwards. Namely, the atmospheric pressure-side transfer robot $RB_2$ at the loader module LM takes out the wafer $A_{04}$ from the load-lock module $LLM_2$.

During a period elapsing between $t_9$ and $t_{10}$, the "$LLM_1$ wafer transfer (LM)" processing is executed (the transfer of an incoming wafer $A_{07}$ in this example). Namely, the atmospheric pressure-side transfer robot $RB_2$ carries the unprocessed wafer $A_{07}$ into the load-lock module $LLM_1$. Once the wafer $A_{07}$ is placed in the load-lock module $LLM_1$, the "$LLM_1$ evacuation" processing is executed at the load-lock module $LLM_1$ over a period elapsing between $t_{10}$ and $t_{12}$ immediately afterwards. As a result, the load-lock module $LLM_1$ becomes evacuated and the pressure of its internal environment is reduced. During a period elapsing between $t_{12}$ and $t_{13}$, which immediately ensues upon completion of the "$LLM_1$ evacuation" processing, the "$LLM_1$ wafer transfer (TM)" processing is executed (the transfer of the outgoing wafer $A_{07}$ in this example). Namely, the vacuum pressure-side transfer robot $RB_1$ at the transfer module TM uses its free transfer arm $F_B$ to retrieve the unprocessed wafer $A_{07}$ from the load-lock module $LLM_1$ through a pick operation.

Subsequently, the transfer arm $F_B$ of vacuum pressure-side transfer robot $RB_1$ holds the unprocessed wafer $A_{07}$ in standby in front of the gate of the process module $PM_1$ until the time point $t_{15}$. As the "$PM_1$ processing" executed on the wafer $A_{06}$ at the process module $PM_1$ ends at the time point $t_{15}$, the "$PM_1$ wafer transfer" processing is executed (the transfer of the outgoing wafer $A_{06}$ and the transfer of the incoming wafer $A_{07}$ in this example) during a period of time elapsing between $t_{15}$ and $t_{17}$ immediately afterwards. Namely, the transfer robot $RB_1$ uses its free transfer arm $F_A$ to carry out the processed wafer $A_{06}$ from the process module $PM_1$ through a pick operation during the period elapsing between $t_{15}$ and $t_{16}$ and immediately afterwards carries the unprocessed wafer $A_{07}$ into the process module $PM_1$ on its transfer arm $F_B$ through a place operation during the period elapsing between t16 and $t_{17}$. Once the wafer $A_{07}$ is placed in the process module $PM_1$, the "$PM_1$ process" processing, i.e., the recipe processing for forming the Ti film on the wafer $A_{07}$, is started immediately at the time point $t_{17}$.

In the process module $PM_2$, the processing corresponding to the "$PM_2$ process", i.e., the recipe processing for forming the TiN film on the wafer $A_{05}$, has been in progress concurrently during the processing described above. The recipe processing on the wafer $A_{05}$ ends at the time point $t_{17}$.

Since the "$PM_1$ wafer transfer" processing described above, too, ends at the time point $t_{17}$, a time period elapsing between $t_{17}$ and $t_{18}$ immediately afterwards can be allocated for the "$PM_2$ wafer transfer" processing (the transfer of the outgoing wafer $A_{05}$ in this example). Namely, the vacuum pressure-side transfer robot $RB_1$ carries out the processed wafer $A_{05}$ on its free transfer arm $F_B$ through a pick operation. It is to be noted that during a time period elapsing between $t_{18}$ and $t_{19}$ immediately afterwards, post-processing is executed in the now empty process module $PM_2$ following the transfer of the outgoing wafer $A_{05}$.

Then, during a period of time elapsing between $t_{19}$ and $t_{20}$ immediately following the end of the post-processing executed in the process module $PM_2$, the "$PM_2$ wafer transfer" processing is executed (the transfer of the incoming wafer $A_{06}$ in this example). Namely, the transfer robot $RB_1$ carries the wafer $A_{06}$ having been carried out on the transfer arm $F_A$ from the process module $PM_1$ earlier into the process module $PM_2$ through a place operation. The process module $PM_2$ enters a standby state which lasts over a period elapsing between $t_{20}$ and $t_{22}$ following the transfer of the incoming wafer $A_{06}$, i.e., the process module $PM_2$ waits in a standby state during the wait time $WT_2$ (2 T) during the "$PM_2$ process". Then, when the wait time $WT_2$ (2 T) is up at the time point $t_{22}$, the recipe processing for forming the TiN film on the wafer $A_{06}$ starts.

In addition, as the wafer $A_{06}$ is carried into the process module $PM_2$ as described above, the "$LLM_1$ wafer transfer (TM)" processing is executed (the transfer of the incoming wafer $A_{05}$ in this example) during a period of time elapsing between $t_{20}$ and $t_{21}$ immediately after. Namely, the vacuum pressure-side transfer robot $RB_1$ carries the wafer $A_{05}$ held on its transfer arm $F_B$, which has undergone the Ti film formation processing and the TiN film formation processing, into the load-lock module $LLM_1$ through a place operation. Once the wafer $A_{05}$ is carried into the load-lock module $LLM_1$, the "$LLM_1$ process" processing is executed at the load-lock module $LLM_1$ over a time period elapsing between $t_{21}$ and $t_{28}$ immediately afterwards.

When the "$LLM_1$ process" processing at the load-lock module $LLM_1$ is completed, the "$LLM_1$ wafer transfer (LM)" processing is executed (the transfer of the outgoing wafer $A_{05}$ in this example) over a time period elapsing between $t_{28}$ and $t_{29}$ immediately afterwards. Namely, the atmospheric pressure-side transfer robot $RB_2$ at the loader module LM takes out the wafer $A_{05}$ from the load-lock module $LLM_1$.

During a period elapsing between $t_{23}$ and $t_{24}$, the "$LLM_2$ wafer transfer (LM)" processing is executed (the transfer of an incoming wafer $A_{08}$ in this example). Namely, the transfer robot $RB_2$ carries the unprocessed wafer $A_{08}$ into the load-lock module $LLM_2$. Once the wafer $A_{08}$ is placed in the load-lock module $LLM_2$, the "$LLM_2$ evacuation" processing is executed at the load-lock module $LLM_2$ over a period elapsing between $t_{24}$ and $t_{26}$ immediately afterwards. As a result, the load-lock module $LLM_2$ becomes evacuated and enters a low pressure state. During a period elapsing between $t_{26}$ and $t_{27}$ which immediately ensues upon completion of the "$LLM_2$ evacuation" processing, the "$LLM_2$ wafer transfer (TM)" processing is executed (the transfer of the outgoing wafer $A_{08}$ in this example). Namely, the vacuum pressure-side transfer robot $RB_1$ at the transfer module TM uses its free transfer arm $F_A$ to retrieve the unprocessed wafer $A_{08}$ from the load-lock module $LLM_2$ through a pick operation.

Subsequently, the transfer arm $F_A$ of the vacuum pressure-side transfer robot $RB_1$ holds the unprocessed wafer $A_{08}$ in standby in front of the gate of the process module $PM_1$ until the time point $t_{29}$. As the "$PM_1$ processing" executed on the wafer $A_{07}$ in the process module $PM_1$ ends the time point $t_{29}$, the "$PM_1$ wafer transfer" processing is executed (the transfer of the outgoing wafer $A_{07}$ and the transfer of the incoming wafer $A_{08}$ in this example) during a period of time elapsing between $t_{29}$ and $t_{31}$ immediately afterwards. Namely, the transfer robot $RB_1$ uses its free transfer arm $F_B$ to carry out the processed wafer $A_{07}$ from the process module $PM_1$ through a pick operation during the period elapsing between $t_{29}$ and $t_{30}$ and immediately afterwards carries the unprocessed wafer $A_{08}$ into the process module $PM_1$ on its transfer arm $F_A$ through a place operation during the period elapsing between $t_{30}$ and $t_{31}$. Once the wafer $A_{08}$ is placed in the process module $PM_1$, the "$PM_1$ process" processing, i.e., the recipe processing for forming the Ti film on the wafer $A_{08}$, is started immediately at the time point $t_{31}$. Subsequently, operations similar to those executed through the sequence described above are repeatedly executed at the individual units.

In the first implementation example described above, the uniform module cycle period MT (14 T) is set for all the process modules and $PM_1$ and $PM_2$ simultaneously engaged in operation at the cluster tool as the total length of required time (including the wait time lengths WT) per wafer. As a result, the wafer processing operations can be continuously executed at the individual process modules $PM_1$ and $PM_2$ over intervals matching the module cycle period MT (14 T).

More specifically, a single cycle in the first process module $PM_1$ includes the attendant busy time (incoming wafer transfer time $AT_1$ (1 T)+outgoing wafer transfer time $BT_1$ (1 T)) lasting over 2 T and the recipe processing time (Ti film formation processing time) lasting over 12 T and this cycle (module cycle) is repeated. A single cycle in the process module $PM_1$ is equivalent to 2 T+12 T=14 T.

A single cycle in the second process module $PM_2$ includes the attendant busy time (outgoing wafer transfer time $BT_2$ (1 T)+incoming wafer transfer time $AT_2$ (1 T)+post-processing time $CT_2$ (1 T)) lasting over 3 T, the wait time $WT_2$ lasting over 2 T and the recipe processing time (TiN film formation processing) lasting over 9 T, and this cycle (module cycle) is repeated in the process module $PM_2$. A single cycle is equivalent to 3 T+2 T+9 T=14 T, which equals the length of a single cycle in the first process module $PM_1$.

During a single cycle (14 T), the vacuum pressure-side transfer robot $RB_1$ accesses each process module $PM_1$ or $PM_2$ only once. Accordingly, in each of the process modules $PM_1$ and $PM_2$, a processed wafer and a preprocess wafer can be exchanged through a single pick and place operation by the vacuum pressure-side transfer robot $RB_1$. It is to be noted that in both process modules $PM_1$ and $PM_2$ where the processing is executed as described above, two successive wafers to undergo the pipeline processing, e.g., a wafer $W_i$ and a wafer $W_{i+1}$, are transferred over a transfer interval, i.e., a transfer tactic, equivalent to 14 T.

As explained above, in the specific example of a transfer sequence presented in FIG. 5, the module cycle period MT for one of the plurality of process modules $PM_1$ and $PM_2$ in the cluster tool, which represents the sum of the length of time over which a wafer stays inside the process module $PM_1$ or $PM_2$ (the length of time elapsing after the wafer is carried in until it is carried out) i.e., the wafer stay time (e.g., wait time+processing time) constituting the substrate stay time, and the attendant busy time, and the module cycle period MT for the other process module $PM_1$ or $PM_2$ are set to a uniform length (14 T).

By adopting this transfer sequence, it is ensured that the wafer processing in the process module $PM_1$ and the wafer processing in the process module $PM_2$ end in the order of $PM_1 \rightarrow PM_2$, and thus, the vacuum pressure-side transfer robot RB at the transfer module TM is able to access the individual process modules $PM_1$ and $PM_2$ in the order matching the sequence through which a given wafer is processed through the process modules $PM_1$ and $PM_2$ so as to carry out the processed wafer $W_i$ and carry in the next wafer $W_{i+1}$ as a replacement through a single access to each process module $PM_1$ or $PM_2$. As a result, the transfer efficiency and the operation rates of the process modules can be greatly improved.

Figure 6:
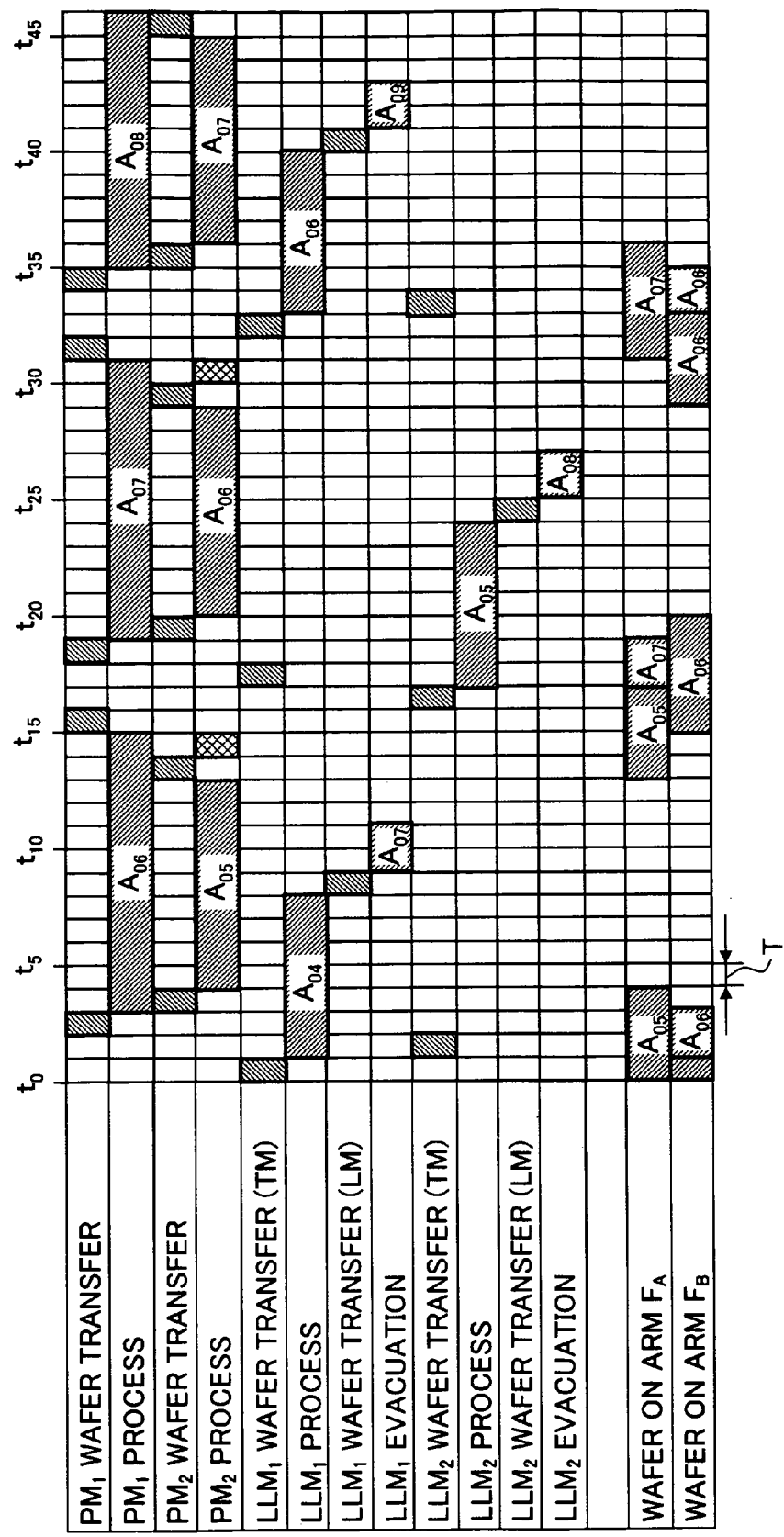
FIG. 6 shows the transfer sequence executed in a first comparison example.

A first comparison example provided in conjunction with the first implementation example is now explained in reference to FIG. 6. The advantages of the first implementation example, i.e., improved transfer efficiency and operation rates achieved by adopting the transfer sequence shown in FIG. 5, can be better understood by comparing it with the first comparison example presented in FIG. 6. In the transfer sequence in the first comparison example, wafers are processed over the wafer stay time lengths set in correspondence to the length of processing time $PT_1$ (12 T) and $PT_2$ (9 T) as indicated in the individual recipes in the process modules $PM_1$ and $PM_2$ as in the related art, without setting a uniform module cycle period MT for the plurality of process modules $PM_1$ and $PM_2$ in the cluster tool.

While the length of processing time $PT_1$ (12 T) and $PT_2$ (9 T (at the process modules $PM_1$ and $PM_2$ are not equal to each other, no uniform module cycle period MT is set and, as a result, the wafer processing may not always end in the order of the process module $PM_1$ first and then the process module $PM_2$ in this comparison example. After either the processing time $PT_1$ (12 T) or the processing time $PT_2$ (9 T) ends, the transfer robot $RB_1$ at the transfer module TM carries out the processed wafer from the process module $PM_1$ or $PM_2$ in coordination with specific conditions under which the cluster tool is currently operating, i.e., in coordination with the state of the wafer transfer in the other units.

As shown in FIG. 6, the "$PM_2$ process" processing at the second process module $PM_2$, i.e., the recipe processing for forming the TiN film at the wafer $A_{05}$ ends at, for instance, the time point $t_{13}$ in this comparison example. During a period elapsing between $t_{13}$ and $t_{14}$, which immediately ensues, the "$PM_2$ wafer transfer" processing is executed (the transfer of the outgoing wafer $A_{05}$ in this example). Namely, the transfer robot $RB_1$ at the transfer module TM accesses the second process module $PM_2$ and carries out the processed wafer $A_{05}$ on its transfer arm $F_A$ through a pick operation. It is to be noted that during a period elapsing between $t_{14}$ and $t_{15}$, which immediately ensues, the post-processing is executed in the now empty process module $PM_2$ from which the wafer $A_{05}$ has been carried out.

In this comparison example, the "$PM_1$ process" processing at the first process module $PM_1$ having been executed concurrently, i.e., the recipe processing for forming the Ti film on the wafer $A_{06}$ ends at the time point $t_{15}$ just as the post-processing at the process module $PM_2$ described above ends. Thus, the transfer robot $RB_1$ still holding the processed wafer $A_{05}$ on its transfer arm $F_A$, accesses the process module $PM_1$ and carries out the processed wafer $A_{06}$ on its free transfer arm $F_B$.

Under such circumstances, it would be ideal to carry in the wafer $A_{07}$ to undergo the processing next as a replacement for the wafer $A_{06}$ being carried out on the free transfer arm $F_B$ at the process module PM since the wafers would then be exchanged through a single access.

However, the other transfer arm $F_A$ is already holding the wafer $A_{05}$ having been taken out of the process module $PM_2$ and thus, the transfer robot cannot perform a place operation to carry in the preprocess wafer $A_{07}$. The wafer $A_{05}$ having been taken out from the process module $PM_2$ disposed on the downstream side in the flow of wafers undergoing the continuous processing has already undergone the entire processing.

Accordingly, the transfer robot $RB_1$ first transfers the processed wafer $A_{05}$ to the load-lock module $LLM_2$ through the "$LLM_2$ wafer transfer" processing executed during the period elapsing between $t_{16}$ and $t_{17}$. Over a subsequent period elapsing between $t_{17}$ and $t_{18}$, the "$LLM_1$ wafer transfer" processing is executed to allow the transfer robot $RB_1$ to take out the unprocessed wafer $A_{07}$ on its transfer arm $F_A$ from the load-lock module $LLM_1$, and then during a subsequent time period elapsing between $t_{18}$ and $t_{19}$, the "$PM_1$ wafer transfer" processing is executed to allow the transfer robot $RB_1$ to return to the process module $PM_1$ to carry the unprocessed wafer $A_{07}$ into the process module $PM_1$ through a place operation of the transfer arm $F_A$. Thus, the transfer robot $RB_1$ transfers the wafers $A_{05}$ and $A_{07}$, while holding the wafer $A_{06}$ on its transfer arm $F_B$.

Then, during a period elapsing between $t_{19}$ and $t_{20}$ after the wafer $A_{07}$ is transferred, the "$PM_2$ wafer transfer" processing is executed to allow the transfer robot $RB_1$ to finally transfer the wafer $A_{06}$ having been held on its transfer arm $F_B$ since the time point $t_{15}$ into the second process module $PM_2$.

In the transfer sequence shown in FIG. 6, a delay (or an interval) over 2 T which elapses after the processed wafer $W_i$ is carried out until an unprocessed wafer $W_j$ to undergo the processing next is carried in, occurs in the first process module $PM_1$. As a result, the wafer processing operation is executed over a 16 T cycle in the first process module $PM_1$. In addition, a delay (or an interval) over 5 T which elapses after the processed wafer $W_i$ is carried out until and unprocessed wafer $W_j$ to undergo the processing next is carried in, occurs in the second process module $PM_2$. As a result, the wafer processing operation is executed over a 16-time block cycle in the second process module $PM_2$, as in the first process module $PM_1$. Thus, the transfer cycle (transfer tactic) over which two successive wafers (e.g., the wafer $W_i$ and the wafer $W_{i+1}$) to undergo the continuous pipeline processing in succession in the transfer sequence in FIG. 6 is 16 T, which is greater than the transfer cycle (transfer tactic) lasting over 14 T in the transfer sequence shown in FIG. 5.

In other words, the transfer tactic can be reduced by 2 T by adopting the transfer sequence in FIG. 5 achieved in the first implementation example rather than the transfer sequence in the first comparison example shown in FIG. 6. This means that the operation cycles at the process modules $PM_1$ and $PM_2$, too, can each be reduced by 2 T. As continuous processing is executed over an extended period of time by repeating the transfer cycle (transfer tactic) and the operation cycles at the process modules $PM_1$ and $PM_2$, the shorter operation cycles result in a great improvement in the overall throughput of the cluster tool.

Second Implementation Example of the Transfer Sequence

Next, the second implementation example of a transfer sequence that may be executed in conformance to the substrate processing program described above in the substrate processing system achieved in the embodiment is explained.

While only the process modules $PM_1$ and $PM_2$ in the cluster tool are engaged in operation and the other process modules $PM_3$ and $PM_4$ are not engaged in operation in the transfer sequence in the first implementation example explained above in reference to FIG. 5, all the process modules $PM_1$, $PM_2$, $PM_3$ and $PM_4$ in the cluster tool are simultaneously engaged in operation in the second implementation example.

Figure 7:
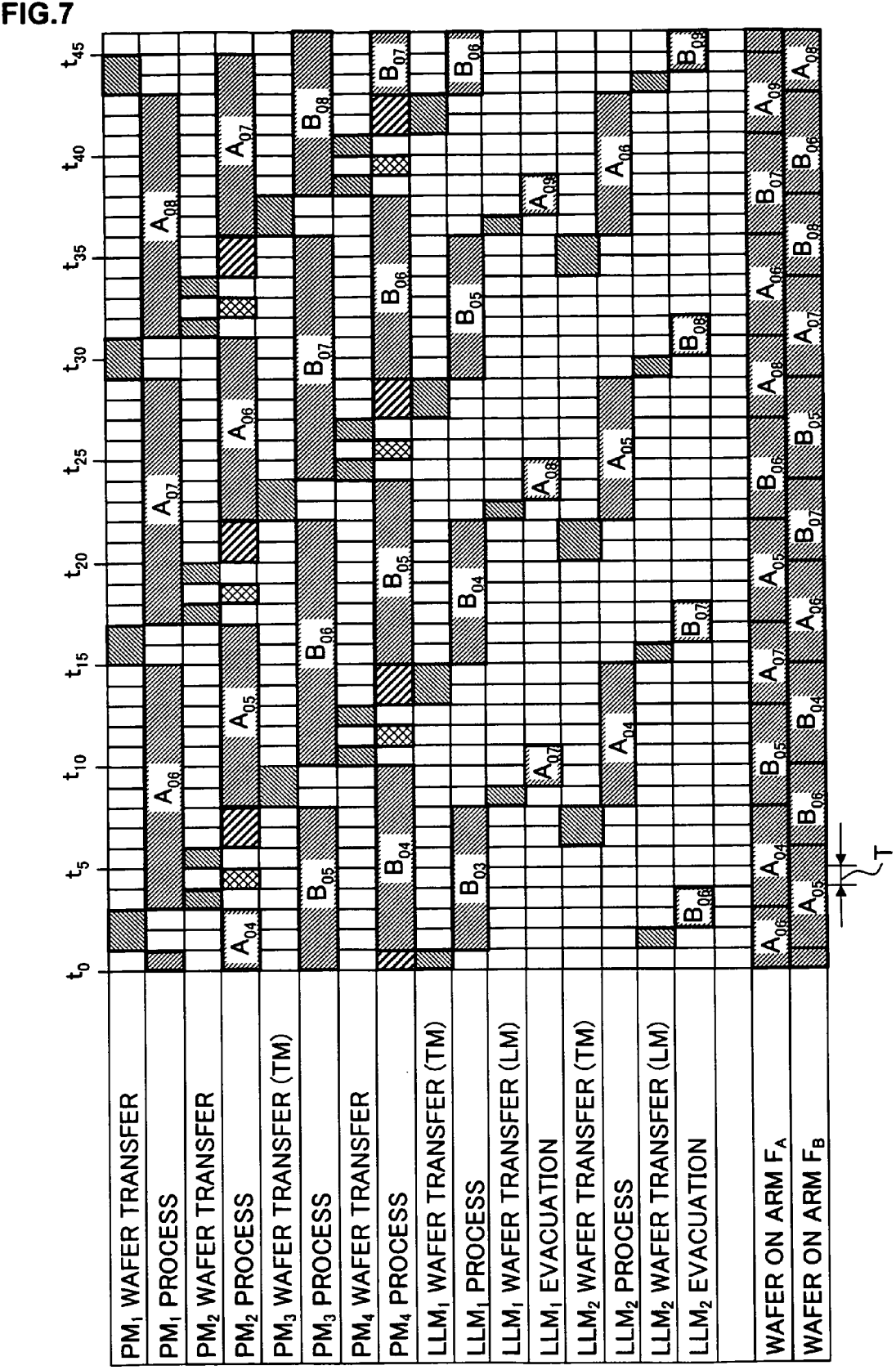
FIG. 7 shows the transfer sequence executed in a second implementation example of the present invention.

The transfer sequence achieved in the second implementation example is shown in FIG. 7. The second implementation example is a specific example of a transfer sequence through which processing in a first pipeline processing system and processing in a second pipeline processing system are executed concurrently.

In the first pipeline processing system, a series of processing (e.g., Ti film formation processing and TiN film formation processing similar to those executed in the first implementation example) is executed on a batch of wafers A (e.g., a predetermined number of wafers $A_{01}$ to $A_{nm}$) transferred sequentially to two process modules $PM_1$ and $PM_2$ of the cluster tool, one wafer at a time from a load port LP via the loader module LM in the substrate processing system shown in FIG. 1.

In the second pipeline processing system, a series of processing (e.g., Ti film formation processing and TiN film formation processing similar to those executed in the first implementation example) is executed on another batch of wafers B (e.g., a predetermined number of wafers $B_{01}$ to $B_{nm}$) transferred sequentially to two process modules $PM_3$ and $PM_4$ of the cluster tool, one wafer at a time from the load port LP via the loader module LM in the substrate processing system shown in FIG. 1.

In addition to the processing executed in the transfer sequence in the first implementation example shown in FIG. 5, the transfer sequence in the second implementation example further includes, for instance, "$PM_3$ wafer transfer" processing, "$PM_4$ wafer transfer" processing, "$PM_3$ process" processing and "$PM_4$ process" processing. During the "$PM_3$ wafer transfer" processing and the "$PM_4$ wafer transfer" processing, the vacuum pressure-side transfer robot $RB_1$ at the transfer module TM accesses the process modules $PM_3$ and $PM_4$ respectively to exchange two wafers, i.e., a processed wafer a and preprocess wafer, through the pick and place operation described earlier. During the "$PM_3$ process" processing and the "$PM_4$ process" processing the wafers B having been placed in the process modules $PM_3$ and $PM_4$ respectively undergo the Ti film formation and the TiN film formation.

In the second implementation example, too, a uniform module cycle period MT (14 T) is set for all the process modules $PM_1$, $PM_2$, $PM_3$ and $PM_4$ simultaneously engaged in operation at the cluster tool as the total lengths of required time (including the wait time lengths WT) per wafer. As a result, the wafer processing operations can be continuously executed at the various process modules $PM_1$, $PM_2$, $PM_3$ and $PM_4$ over intervals matching the module cycle period MT (14 T).

More specifically, a single cycle in the first process module $PM_1$ and $PM_3$ in the two separate pipeline systems, i.e., the first and second pipeline processing systems, includes the attendant busy time (incoming wafer transfer time $AT_1$ (1 T)+outgoing wafer transfer time $BT_1$ (1 T)) lasting over 2 T and the recipe processing time (Ti film formation processing time) lasting over 12 T and this cycle (module cycle) is repeated. A single cycle in the first process modules is equivalent to 2 T+12 T=14 T.

A single cycle in the second process modules $PM_2$ and $PM_4$ includes the attendant busy time (incoming wafer transfer time $AT_2$ (1 T)+outgoing wafer transfer time $BT_2$ (1 T)+post-processing time $CT_2$ (1 T)) lasting over 3 T, the wait time the $WT_2$ lasting over 2 T and the recipe processing time (TiN film formation processing) lasting over 9 T, and this cycle (module cycle) is repeated in the second process modules. A single cycle is equivalent to 3 T+2 T+9 T=14 T, which equals the length of a single cycle in the first process modules $PM_1$ and $PM_3$.

During a single cycle (14 T), the vacuum pressure-side transfer robot $RB_1$ accesses each process modules $PM_1$, $PM_2$, $PM_3$ and $PM_4$ only once. Accordingly, in each of the process modules $PM_1$, $PM_2$, $PM_3$ and $PM_4$ a processed wafer and a preprocess wafer can be exchanged through a single pick and place operation by the vacuum pressure-side transfer robot $RB_1$. In other words, wafer exchange can be completed within a time span lasting over 14 T in each of the process modules $PM_1$, $PM_2$, $PM_3$ and $PM_4$.

It is to be noted that in both pipeline processing systems where the processing is executed as described above, two successive wafers to undergo the pipeline processing, e.g., the wafer $W_i$ and the wafer $W_{i+1}$, are transferred over a transfer interval (transfer tactic) equivalent to 14 T.

In addition, it is desirable to execute the processing in the first pipeline processing system and the processing in the second pipeline processing system by offsetting the processing periods by a length of time designated as a time adjustment lag GT which may last over ½ of the single cycle length (GT=module cycle period MT/2). By allowing for such a time adjustment lag, it is ensured that the wafer transfer operations at the process modules $PM_1$ and $PM_2$ in the first pipeline processing system and the wafer transfer operations at the process modules $PM_3$ and $PM_4$ in the second pipeline processing system do not interfere with each other.

It is to be noted that wafers are transferred between the loader module LM and the load-lock module $LLM_1$ and between the loader module LM and the load-lock module $LLM_2$ with transfer timing that does not allow the transfer operations in the individual pipeline processing systems to interfere with each other.

It is particularly important to make an optimal timing adjustment when there is a significant difference between .SIGMA.CT (I) representing the total sum $(CT_1+CT_2)$ of the attendant busy time lengths in the process modules $PM_1$ and $PM_2$ in the first pipeline processing system and .SIGMA.CT (II) representing the total sum of the attendant busy time lengths $(CT_3+CT_4)$ at the process modules $PM_3$ and $PM_4$ in the second pipeline processing system.

For instance, if $\Sigma$ CT (I) is greater than $\Sigma$ CT (II), it takes the transfer robot $RB_1$ at the transfer module TM to execute the transfer processing for the first pipeline processing system than the transfer processing for the second pipeline processing systems. In other words, it takes a greater length of time for a single wafer to be processed through the individual units in the first pipeline processing system than the length of time required by a single wafer to be processed through the individual units in the second pipeline processing system.

Under such circumstances, the processing in the first pipeline processing system is offset relative to the processing in the second pipeline processing system by slightly advancing the processing in the first pipeline processing system, so as to slightly hasten the timing with which the unprocessed wafer is carried out in the first pipeline processing system. Alternatively, the processing in the second pipeline processing system may be offset relative to the processing in the first pipeline system by slightly retarding the processing in the second pipeline processing system, so as to slightly delay the timing with which the unprocessed wafer is carried out in the second pipeline processing system.

More specifically, such a time adjustment for the first and second pipeline processing systems may be achieved by adjusting the time adjustment lag GT mentioned above in correspondence to the difference between $\Sigma$ CT (I) and $\Sigma$ CT(II). GT (I) representing a time adjustment lag to be set to offset the processing in the first pipeline processing system relative to the processing in the second pipeline processing system and GT (II) representing a time adjustment lag to be set to offset the processing in the second pipeline processing system relative to the processing in the first pipeline processing system may be respectively expressed as in (1) and (2) below. It is to be noted that MT in expressions (1) and (2) indicates the module cycle period (14 T).

$$GT(I) = \{MT - (\Sigma CT(I) - \Sigma CT(II))\}/2 \quad (1)$$

$$GT(II) = \{MT - (\Sigma CT(II) - \Sigma CT(I))\}/2 \quad (2)$$

Thus, a throughput which is double that in the first implementation example is achieved in the second implementation example in which pipeline processing similar to that in the first implementation example is executed in parallel in two systems.

In addition, the modules other than the process modules, such as the transfer module TM (the transfer robot $RB_1$) the load-lock modules $LLM_1$ and $LLM_2$ and the loader module LM (the transfer robot $RB_2$) are engaged in operation in the second implementation example with operation rates double those in the first implementation example.

More specifically, as shown in FIG. 7, the vacuum pressure-side transfer robot $RB_1$ at the transfer module TM accesses the process module $PM_1$ and executes a pick and place operation to carry out a processed wafer $A_{06}$ on its free transfer arm $F_B$ and carry in an unprocessed wafer $A_{07}$ on its transfer arm $F_A$ as a replacement through the "$PM_1$ wafer transfer" processing during a period elapsing between $t_{15}$ and $t_{17}$. The transfer arm $F_B$ is available for this operation since it has already transferred a processed wafer $B_{04}$ into the load-lock module $LLM_1$ through the "$LLM_1$ wafer transfer (TM)" processing executed during the immediately preceding period elapsing between $t_{13}$ and $t_{15}$.

Next, the vacuum pressure-side transfer robot $RB_1$ accesses the process module $PM_2$ adjacent to the process module $PM_1$ and executes a pick and place operation to carry out a processed wafer $A_{05}$ on its transfer arm $F_A$ through the "$PM_2$ wafer transfer" processing during a period elapsing between $t_{17}$ and $t_{18}$. The vacuum pressure-side transfer robot $RB_1$, still holding the processed wafer $A_{05}$ on its transfer arm $F_A$, waits in standby while the post-processing is executed in the process module $PM_2$ as part of the "$PM_2$ process" processing, during a period elapsing between $t_{18}$ and $t_{19}$. Once the post-processing ends, the transfer robot $RB_1$ carries the wafer $A_{06}$ held on the transfer arm $F_B$, which has been taken out from the process module $PM_1$, into the process module $PM_2$ through the "$PM_2$ wafer transfer" processing during a period elapsing between $t_{19}$ and $t_{20}$.

The vacuum pressure-side transfer robot $RB_1$ next accesses the load-lock module $LLM_2$ and executes a pick and place operation to carry out a unprocessed wafer $B_{07}$ on its free transfer arm $F_B$ and carry in the wafer $A_{05}$ on the transfer arm $F_A$, which has been taken out of the process module $PM_2$, through the "$LLM_2$ wafer transfer (TM)" processing during a period elapsing between $t_{20}$ and $t_{22}$.

Next, the transfer robot $RB_1$ accesses the process module $PM_3$ and executes a pick and place operation to carry out a processed wafer $B_{06}$ on its free transfer arm $F_A$ and carry in the unprocessed wafer $B_{07}$ on its transfer arm $F_B$ as a replacement through the "$PM_3$ wafer transfer" processing during a period elapsing between $t_{22}$ and $t_{24}$. Immediately afterwards, the transfer robot $RB_1$ accesses the process module $PM_4$ and executes a pick and place operation to carry out a processed wafer $B_{05}$ on its free transfer arm $F_B$ through "$PM_4$ wafer transfer" processing during a period elapsing between $t_{24}$ and $t_{25}$. The vacuum pressure-side transfer robot $RB_1$, still holding the processed wafer $B_{05}$ on its transfer arm $F_B$, waits in standby while the post-processing is executed in the process module $PM_4$ as part of the "$PM_4$ process" processing, during a period elapsing between $t_{25}$ and $t_{26}$. Once the post-processing ends, the transfer robot $RB_1$ carries the wafer $B_{06}$ held on the transfer arm $F_A$, which has been taken out from the process module $PM_3$, into the process module $PM_4$ through the "$PM_4$ wafer transfer" processing during a period elapsing between $t_{26}$ and $t_{27}$.

The vacuum pressure-side transfer robot $RB_1$ accesses the load-lock module $LLM_1$ and executes a pick and place operation to carry out a unprocessed wafer $A_{08}$ on its free transfer arm $F_A$ and carry in the wafer $B_{05}$ on the transfer arm $F_B$, which has been taken out of the process module $PM_2$, through the "$LLM_1$ wafer transfer (TM)" processing during a period elapsing between $t_{27}$ and $t_{29}$.

During a period elapsing immediately afterwards between $t_{29}$ and $t_{31}$, the vacuum pressure-side transfer robot $RB_1$ accesses the process module $PM_1$ and executes a taken place operation to carry out the processed wafer $A_{07}$ on its transfer arm $F_B$ and carry in an unprocessed wafer $A_{08}$ on its transfer arm $F_A$ as a replacement through the "$PM_1$ wafer transfer" processing. Subsequently, operations similar to those explained above are repeatedly executed.

Since the two pipeline processing systems are engaged in operation, the transfer robot $RB_1$ needs to execute a greater number of transfer operations in the second implementation example compared to the first implementation example in which only a single pipeline processing system is engaged. However, since the processing in one of the pipeline processing systems is offset relative to the processing in the other pipeline processing system as described above, the transfer robot $RB_1$ is able to execute the transfer operations with a high level of operational efficiency.

In addition, since the individual modules $PM_1$, $PM_2$, $PM_3$, $PM_4$, $LLM_1$ and $LLM_2$ can be accessed through pick and place operations, the transfer arms $F_A$ and $F_B$, too, are able to hold and handle wafers with a high level of operational efficiency.

In the load-lock modules $LLM_1$ and $LLM_2$, wafers are sequentially exchanged through pick and place operations executed by the transfer robot $RB_1$ to enable highly efficient wafer processing. For instance, as the "$LLM_2$ process" processing is executed on a wafer $A_{04}$ during a period elapsing between $t_8$ and $t_{15}$ in the load-lock module $LLM_2$, the atmospheric pressure-side robot $RB_2$ at the loader module LM carries out the processed wafer $A_{04}$ from the load-lock module $LLM_2$ and carries the unprocessed wafer $B_{07}$ into the load-lock module $LLM_2$ as a replacement through the "LLM wafer transfer (LM)" processing executed immediately afterwards during a period elapsing between $t_{15}$ and $t_{16}$, as shown in FIG. 7.

It is to be noted that wafers are each transferred between the load-lock module $LLM_1$ and the loader module LM or between the load-lock module $LLM_2$ and the loader module LM within 1 T. As the unprocessed wafer $B_{07}$ is carried into the load-lock module LLM, the "$LLM_2$ evacuation" processing is executed immediately afterwards during a period elapsing between $t_{16}$ and $t_{18}$ to depressurize the internal space at the load-lock module $LLM_2$ through evacuation.

Once the evacuation is completed, the vacuum pressure-side transfer robot $RB_1$ at the transfer module TM carries out the unprocessed wafer $B_{07}$ from the load-lock module $LLM_2$ during a subsequent period of time elapsing between $t_{20}$ and $t_{21}$ through the "$LLM_2$ wafer transfer processing" and then, immediately afterward, the transfer robot carries the processed wafer $A_{05}$ into the load-lock module to $LLM_2$ through the "$LLM_2$ wafer transfer (TM)" processing during a period elapsing between $t_{21}$ and $t_{22}$. Once the wafer $A_{05}$ is placed in the load-lock module $LLM_2$, the "$LLM_2$ process" processing is executed during a period elapsing between $t_{22}$ and $t_{29}$. Subsequently, operations similar to those described above are repeatedly executed. Similar operations are repeatedly executed in the load-lock module $LLM_1$, as well.

It is to be noted that while the wafer processing executed in the first pipeline processing system and the wafer processing executed in the second pipeline processing system are similar to each other in the second implementation example, the present invention is not limited to this example and wafers may be processed differently in the first pipeline processing system and the second pipeline processing system by adopting a transfer sequence similar to that to be explained in reference to the second embodiment.

For instance, wafers may be processed in the process modules PM1 and $PM_2$ in the first pipeline processing system with their total lengths of required time per wafer $ST_1$ and $ST_2$ respectively lasting over 14 T and 12 T. Wafers may be processed concurrently in the process modules $PM_3$ and $PM_4$ in the second pipeline processing system with their total lengths of required time per wafer respectively lasting over 13 T and 10 T. Under such circumstances, a transfer sequence such as that described below may be adopted.

The total length of required time $ST_1$ at the process module $PM_1$ is the greatest total length of required time ST(MAX) among all the process modules in the cluster tool in this example. Accordingly, the total lengths of time (including wait time lengths (WT)) required to process a single wafer in the process modules $PM_1$, $PM_2$, $PM_3$ and $PM_4$ engaged in concurrent operation at the cluster tool are all set to a uniform module cycle period MT (14 T) matching the greatest total lengths of required time ST(MAX). As a result, the wafer processing operations in the process modules $PM_1$, $PM_2$, $PM_3$ and $PM_4$ are all executed over 14 T cycles, and the transfer tactic is also equivalent to 14 T.

As described above, the entire transfer sequence in the cluster tool is determined (patterned or standardized) based upon a single total lengths of required time (the greatest total length of required time ST(MAX)) that is the greatest among all the total lengths of required time set in the recipes corresponding to the individual process modules simultaneously engaged in operation in the cluster tool, and thus, the program in conformance to which the transfer system is driven can be simplified and the challenges in software design structuring can be reduced.

(Transfer Sequence for the First Wafer)

Next, an explanation is given on the transfer sequence with which the first wafer (the first wafer in the lot) $A_{01}$ in a batch of wafers (a single lot of wafers) A to undergo continuous processing in the first implementation example or the second implementation example is processed. When the first wafer $A_{01}$ is transferred through the cluster tool by accessing the process module $PM_1$ first and then the process module $PM_2$, the process modules $PM_1$ and $PM_2$ are both in a wafer-free state. Since there is no processed wafer for the vacuum pressure-side transfer robot $RB_1$ at the transfer module TM to carry out when the first wafer $A_{01}$ is transferred into each of the process modules $PM_1$ and $PM_2$, the vacuum pressure-side transfer robot $RB_1$ only needs to execute a place operation to carry the wafer $A_{01}$ into the process module without having to execute a pick operation to carry out a processed wafer. In particular, after the wafer $A_{01}$ is carried out of the upstream-side process module $PM_1$, the wafer $A_{01}$ can be immediately taken into the process module $PM_2$.

However, if the first wafer $A_{01}$ having been carried out of the upstream-side process module $PM_1$ is taken into the process module $PM_2$ immediately, as described above, the timing with which the recipe processing on the first wafer $A_{01}$ is started in the process module $TM_2$ will be hastened, which means that the recipe processing will end earlier. At this time, the recipe processing on the next wafer $A_{02}$ is concurrently in progress at the process module $PM_1$, and thus, the timing with which the recipe processing on the next wafer $A_{02}$ ends at the process module $PM_1$ may coincide with the timing with which the recipe processing on the first wafer $A_{01}$ ends at the process module $PM_2$.

Figure 8:
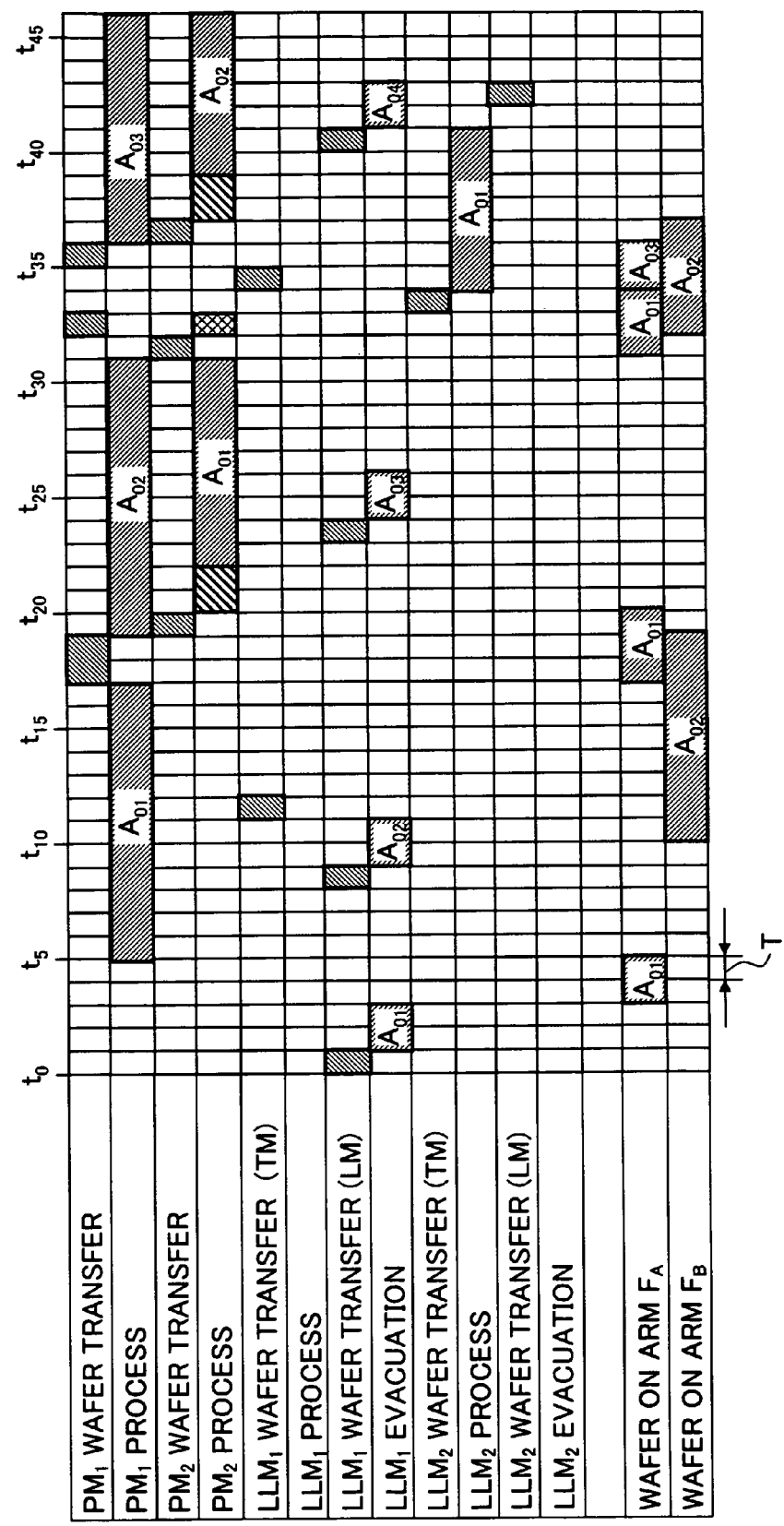
FIG. 8 presents an example of the transfer sequence corresponding to the processing of the first wafer.

More specifically, the "$PM_2$ wafer transfer" for the first wafer $A_{01}$ is completed quickly (1 T) during a period elapsing between $t_{19}$ and $t_{20}$ and thus, the timing with which the recipe processing on the first wafer $A_{01}$ ends at the process module $PM_2$, too, is hastened in the transfer sequence shown in FIG. 8. For this reason, the "$PM_2$ process" processing started at the process module $PM_2$ at the time point $t_{20}$ ends at a time point $t_{31}$ just as the "$PM_1$ process" processing started at the process module $PM_1$ at the time point $t_{19}$ ends at the same time point $t_{31}$.

In this situation, if priority is given to the "$PM_2$ wafer transfer" processing for carrying out the wafer $A_{01}$ from the downstream-side process module $PM_2$ so as to execute this processing during a period elapsing between $t_{31}$ and $t_{32}$, as shown in FIG. 8, the "$PM_1$ wafer transfer" processing for carrying out the wafer $A_{02}$ from the upstream-side process module $PM_1$ is executed during a subsequent time period elapsing between $t_{32}$ and $t_{33}$, thereby delaying the "$PM_1$ wafer transfer" processing.

Furthermore, the "$LLM_2$ wafer transfer (TM)" processing for carrying the processed wafer $A_{01}$ into the load-lock module $LLM_2$ is executed during a subsequent period of time elapsing between $t_{33}$ and $t_{34}$, the "$LLM_1$ wafer transfer (TM)" processing for carrying in an unprocessed wafer $A_{03}$ from the load-lock module $LLM_1$ is executed during a subsequent period of time elapsing between $t_{35}$ and $t_{36}$ and then the "$PM_1$ wafer transfer" processing for carrying the unprocessed wafer $A_{03}$ into the process module $PM_1$ is executed during a subsequent period of time elapsing between $t_{34}$ and $t_{35}$. As a result, a considerable delay occurs with regard to the processing for transferring the unprocessed wafer $A_{03}$ into the process module $PM_1$. This delay results in a delay (interval) equivalent to 2 T in the wafer processing operation cycle at the process module $PM_1$, and ultimately leads to a delay (or an interval) equivalent to 2 T in the wafer processing operation cycle at the process module $PM_2$ as well. In other words, the transfer sequence shown in FIG. 8 lowers the transfer efficiency and increases the transfer tactic.

Accordingly, when the first wafer in the batch is sequentially processed in the plurality of process modules, it is desirable to carry the first wafer into each process module other than the process module where the first wafer undergoes first processing after the module cycle corresponding to a virtual wafer which does not exist in reality but is assumed to have been processed prior to the first wafer elapses. By transferring the first wafer in this manner, the recipe processing on the first wafer in each process module can be completed with non-conflicting timing.

Figure 9:
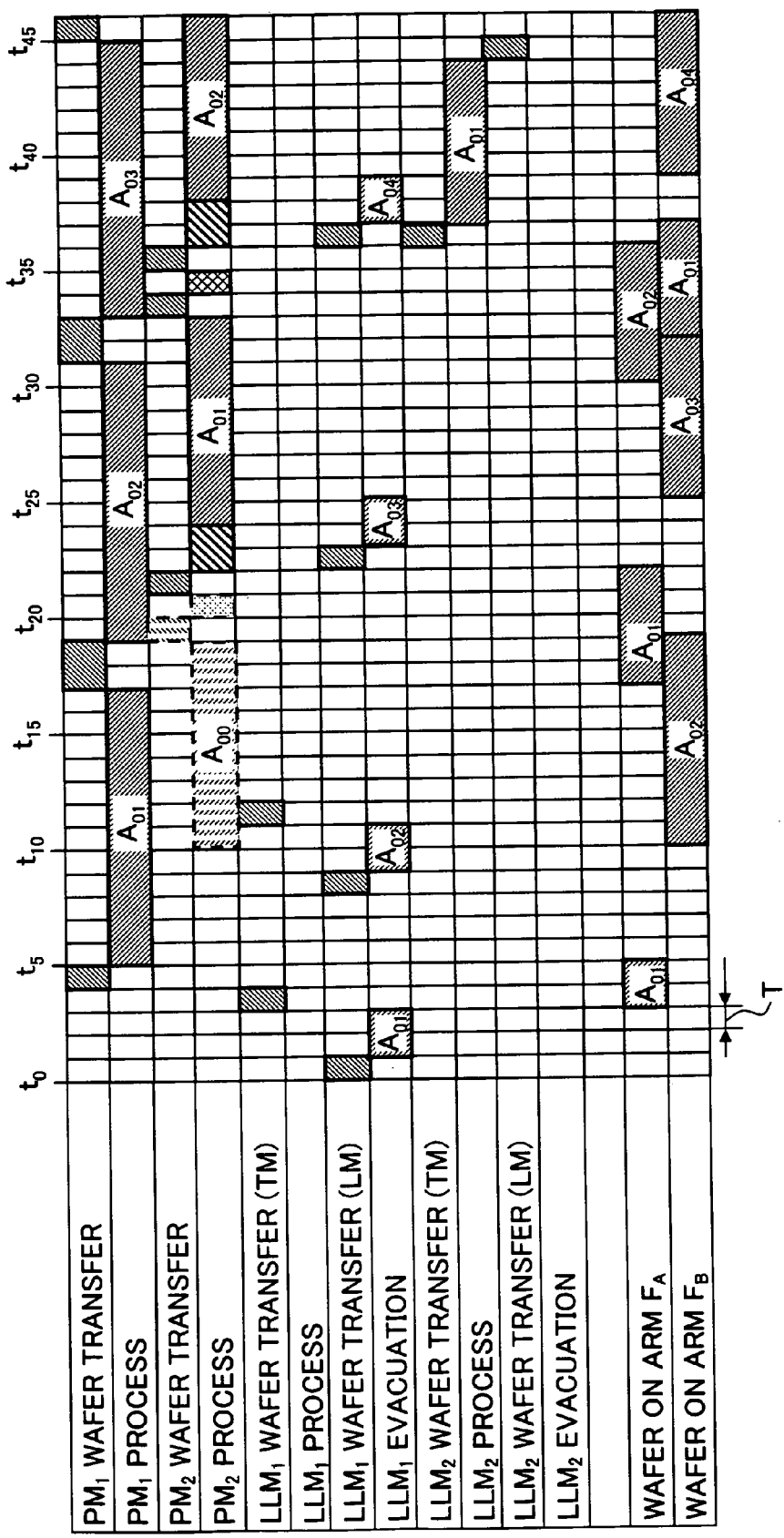
FIG. 9 shows the processing of the first wafer through the transfer sequence executed in the first implementation example.

FIG. 9 shows part of the transfer sequence having been explained in reference to the first implementation example in reference to FIG. 5, which corresponds to the processing of the first wafer, in a specific example of an application of the present invention. As shown in FIG. 9, when the first wafer (the first wafer of a lot) $A_{01}$ undergoes the processing at the process modules $PM_1$ and $PM_2$ in sequence, the first wafer $A_{01}$ is carried into the process module $PM_2$ on the downstream side only after the module cycle period MT (14 T) corresponding to a single cycle elapses for a virtual wafer $A_{00}$ which does not actually exist and then the first wafer $A_{01}$ is processed at the process module $PM_2$, just as the actual wafers $A_{01}$ and $A_{nm}$ undergo the wafer processing.

By transferring the first wafer $A_{01}$ into the process module $PM_2$ after allowing the module cycle period MT (14 T) to elapse in correspondence to the virtual wafer, the wafer processing operations can be executed on the first wafer $A_{01}$ over cycles matching the transfer sequence in FIG. 5 as well. As a result, the wafer processing ends at the individual process modules do not coincide with one another, so as to ensure that the overall transfer efficiency in the substrate processing system is maintained at a desired level.

It is to be noted that no actual processing is in progress while the module cycle period MT corresponding to the virtual wafer $A_{00}$ elapses, and accordingly, the vacuum pressure-side transfer robot $RB_1$ and the like may execute wafer processing or the like for a wafer other than the first wafer $A_{01}$. However, the vacuum pressure-side transfer robot $RB_1$ needs to be in a ready state to carry the first wafer $A_{01}$ into the process module $PM_2$ at least by the time the module cycle period MT corresponding to the virtual wafer $A_{00}$ elapses.

Accordingly, as in the example in FIG. 9 indicates, no processing other than the processing on the first wafer $A_{01}$ should be executed during a virtual recipe processing period elapsing between, for instance, $t_{10}$ and $t_{19}$, a virtual outgoing wafer transfer period elapsing between $t_{19}$ and $t_{20}$ and a virtual post-processing period elapsing between $t_{20}$ and $t_{21}$. It is to be noted that the essential requirement of the present invention is that the time point ($t_{21}$ in the example presented in FIG. 9) at which the module cycle period MT corresponding to the virtual wafer $A_{00}$ ends be ascertained and the types of virtual processing that hypothetically take place during the module cycle period MT for the virtual wafer $A_{00}$ are not limited to those described above.

It is to be noted that while an explanation is given above in reference to the embodiment of the present invention on an example in which a uniform module cycle period MT is set for all the process modules, and a single cycle corresponding to the module cycle period MT at a process module with a short recipe processing time includes a wait time during which the wafer is kept in standby for the recipe processing, the present invention is not limited to this example and if, for instance, there is a significant difference between the lengths of recipe processing time at the individual process modules, each cycle corresponding to the module cycle period MT at the process module with the shorter recipe processing time may include a transfer period during which the processed wafer resulting from the processing is returned to the load-lock module and an unprocessed wafer is fetched from the load-lock module, instead of a wait time during which the wafer is kept in standby for the recipe processing.

A specific example of this application is now explained. According to the present invention, the transfer robot $RB_1$ at the transfer module TM accesses the individual process modules in the order with which a wafer A goes through the processing in the plurality of process modules (e.g., $PM_1$ and $PM_2$), and the transfer robot $RB_1$ carries out a processed wafer $A_i$ and carries in the next wafer $A_{i+1}$ as a replacement through a single access to each process module. It is to be noted that in this transfer sequence, the wafer $A_{i+1}$ among the wafers $A_i$ and $A_{i+1}$ undergoing the processing in sequence is first carried out from the upstream-side process module $PM_1$ and then, the wafer $A_i$ is carried out of the downstream-side process module $PM_2$.

However, if a wait time for keeping the wafer in standby for the recipe processing is created to elapse during each cycle corresponding to the module cycle period MT when there is a significant difference between the lengths of recipe processing time $PT_1$ at the upstream-side process module $PM_1$ and the recipe processing time $PT_2$ at the downstream-side process module $PM_2$ ($PT_1 >> PT_2$), the length of this wait time is bound to become significant. If transfer processing for taking out the processed wafer the processing of which has ended first from the downstream-side process module $PM_2$ and returning it to the load-lock module and also transfer processing for fetching an unprocessed wafer to undergo the processing at the upstream-side process module $PM_1$ from the load-lock module can both be executed by effectively taking advantage of this time difference, instead, a reduction in the module cycle period MT may be achieved.

Accordingly, if there is a large difference between the lengths of recipe processing time at the individual process module $PM_1$, an alternative transfer sequence through which the transfer robot $RB_1$ immediately takes out the processed wafer $A_i$ from the process module $PM_2$, returns it to the load-lock module $LLM_1$ ($LLM_2$), takes out an unprocessed wafer $A_{i+2}$ and transfers it to the upstream process module $PM_1$ without allowing any wait time $WT_2$ to elapse at the downstream-side process module $PM_2$ may be adopted.

When such a transfer sequence is adopted, the transfer robot $RB_1$ holding the unprocessed wafer $A_{i+2}$ should be ready at the position facing opposite the process module $PM_1$ by the time the recipe processing on the wafer $A_{i+1}$ executed at the upstream-side process module $PM_1$ ends. It is to be noted that the wafer $A_i$ among the wafers $A_i$ and $A_{i+1}$ undergoing the processing in sequence is first carried out of the downstream-side process module $PM_2$ and then the wafer $A_{i+1}$ is carried out from the upstream-side process module $PM_1$ in this transfer sequence, in the reverse order from that in the transfer sequence achieved in the first implementation example explained earlier.

The transfer sequence in the current example achieves an advantage in that when post-processing is executed at the downstream-side process module $PM_2$, the post-processing at the process module $PM_2$ and the transfer processing ($PM_2 \rightarrow LLM_1$ (or $LLM_2$)$\rightarrow PM_1$) by the transfer robot $RB_1$ can be executed concurrently.

It is to be noted that while each length of processing time PT set in a processing recipe is indicated as an integral multiple of the basic unit time block T in order to simplify the explanation of the transfer sequences in FIGS. 5, 7 and 9, the present invention is not limited to this example and given processing time PT may assume any length of time that is not necessarily instead of in integral multiple of the basic unit time block T.

For instance, in the barrier film (Ti/TiN film) formation processing described above, the recipe processing time $PT_1$ required at the process module $PM_1$ to form a Ti film may be set at 179 sec and the recipe processing time $PT_2$ required at the process module $PM_2$ to form a TiN film may be set to 151 sec. Under such circumstances, the incoming wafer transfer time $AT_1$ and the outgoing wafer transfer time $BT_1$ at the process module $PM_1$ may each be set to 10 sec and the incoming wafer transfer time $AT_2$, the outgoing wafer transfer time $BT_2$ and the post-processing time $CT_2$ at the process module $PM_2$ may each be set to 10 sec so as to achieve a total length of required time per wafer $ST_1$ for the process module $PM_1$, which amounts to $PT_{1+A}T_1+BT_1=179+10+10=199$ sec, and achieve a total length of required time per wafer $ST_2$ for the process module $PM_2$, which amounts to $PT_2+AT_2+BT_2+CT_2=151+10+10+10=181$ sec. In this case, the largest total length of required time ST(MAX) is $ST_1$ spanning a period of 199 sec. Accordingly, a uniform module cycle period MT of at least 199 sec (preferably 199 sec) should be set for both the process modules $PM_1$ and $PM_2$. It is to be noted that when the module cycle period MT is set to 199 sec, the wait time $WT_2$ to elapse at the process module $PM_2$ is calculated to be; $WT_2=199-181=18$ sec.

In addition, while an explanation is given above in reference to the embodiment on an example in which the recipe processing executed in the various process modules at the cluster tool is continuous in-line processing (the entire processing is continuously executed within the substrate processing system) for Ti/TiN film formation, the present invention is not limited to this example and may be adopted in various types of continuous in-line processing.

For instance, the present invention may be adopted in conjunction with continuous in-line processing during which a pre-clean step (a cleaning step executed as preprocessing) and a subsequent iPVD step are executed. In the pre-clean step, the surface of the substrate (e.g., a semiconductor wafer) is cleaned in preparation for thin film formation or thin film deposition. If the surface of the substrate becomes oxidized, the electrical characteristics of the material changes greatly, and this may result in degraded performance of a semiconductor device formed on the substrate. Accordingly, before the substrate undergoes the initial processing (primary processing) for the film formation to be achieved through a physical deposition method or a chemical deposition method, it is desirable to remove any oxides (mainly silicon dioxide and metal oxides) from the surface thereof by executing a pre-clean step as preprocessing. The surfaces of trenches or contacts formed on the substrate as areas where metal such as tungsten, aluminum or copper is to be deposited in particular need to be cleaned through such a pre-clean step, in order to secure a very low resistance between each trench or contact and the barrier layer to be formed on the surface of the trench or the contact.

Through the iPVD (ionized physical vapor deposition) method mentioned above or a physical vapor phase epitaxy method, a thin film with which even a staged area can be covered reliably is formed by ionizing sputter particles. The high directivity of, for instance, an iPVD thin film is achieved through the process of metal particles sputtered from the target becoming ionized in plasma and the metal ions becoming accelerated within the sheath on the surface of the substrate and entering the substrate at a right angle.

It is to be noted that the cluster tool in the embodiment may be provided as a substrate processing system where continuous in-line processing including the pre-clean step and the iPVD step described above is executed, having any two of the process modules $PM_1$, $PM_2$, $PM_3$ and $PM_4$ constituted as a pre-clean module (pre-clean chamber) and an iPVD module (iPVD chamber).

The iPVD module in this cluster tool may be a sputtering device (iPVD device) capable of executing a Cu integration step during which a Cu thin film is embedded for wiring and a Cu barrier layer (barrier metal) is deposited successively. In such a substrate processing system, viaducts are first formed at an insulating layer through etching and then, the pre-clean module is engaged to grind away the impurity base layer by etching the oxidized Cu surface layer (or by cleaning the surface) so as to expose the lower Cu layer before the Cu barrier layer (TaN/Ta) is formed over the Cu layer through iPVD. Then, the substrate is transferred into the iPVD module where the Cu barrier layer (TaN/Ta) is formed through iPVD before any natural oxide film or the like forms at the exposed Cu layer surface. Since the substrate having undergone the pre-clean processing in the processing chamber at the pre-clean module (corresponds to the first process module $PM_1$) is transferred immediately into the iPVD module (corresponds to the second process module $PM_2$) within the vacuum environment without any wait time, formation of a natural oxide film or the like at the exposed surface of the Cu layer, over which the Cu barrier layer is yet to be formed, is prevented.

It is generally considered to be best to set the length of processing time in the pre-clean step to 80 sec and set the length of processing time in the iPVD step to 120 sec for such a Cu integration process. Assuming that no post-processing is executed either at the pre-clean module (corresponds to the process module $PM_1$) or the iPVD module (corresponds to the process module $PM_2$) and that the lengths of incoming wafer transfer time $AT_1$ and $AT_2$ and the lengths of outgoing wafer transfer time $BT_1$ and $BT_2$ at the modules $PM_1$ and $PM_2$ are each set at 10 sec, the total lengths of required time per wafer $ST_1$ and $ST_2$ corresponding to the modules $PM_1$ and $PM_2$ are calculated as below.

Namely, the total length of required time $ST_1$ at the pre-clean module $PM_1$ is calculated to be $PT_1+AT_1+BT_1=80+10+10=100$ sec, whereas the total length of required time $ST_2$ at the iPVD module $PM_2$ is calculated to be $PT_2+AT_2+BT_2=120+10+10=140$ sec. Accordingly, the total length of required time $ST_2$ at 140 sec corresponding to the iPVD module $PM_2$ is designated as the largest total length of required time ST(MAX). This means that a uniform module cycle period MT of at least 140 sec (preferably 140 sec) should be set for all the modules $PM_1$ and $PM_2$.

As another example of the continuous in-line processing, a UVO (ultraviolet oxidation) step and a subsequent MOCVD (metal organic chemical vapor deposition) step may be executed in succession on a substrate such as an Si substrate.

As MOS devices become further miniaturized, it is expected that in the near future, the gate insulating film at a MOS device will need to have a further reduced film thickness of 1 nm or less if the insulating film is to be constituted with a silicon oxide film. This film thickness is equivalent to a 3- to 4-atom layer. If a silicon oxide film with such an extremely small film thickness is used, concerns such as an increase in the tunnel current, diffusion of elements doped over the gate electrodes and reduced reliability arise and, for this reason, the gate insulating film needs to be a film constituted of material achieving a high dielectric constant (a so-called high-k film). Desirable materials that may be used to form this type of high-k film include transition metal oxides such as $ZrO_2$ and $HfO_2$, rare earth oxides such as $La_2O_3$ and silicates thereof. The high dielectric constant film may be formed by adopting the MOCVD method.

However, a composition transition layer (silicate layer) constituted of silicates is formed between the high dielectric constant film and the Si substrate, and the presence of the silicate layer gives rise to the possibility of formation of a composition transition layer constituted of Si in an intermediate state of oxidation between the silicate layer and the Si substrate. It is necessary to form an $SiO_2$ layer to function as an oxide film formation preventing layer through UVO processing before forming the high dielectric constant film, in order to prevent the formation of such a composition transition layer. There is an added advantage invented to forming an oxide film formation preventing layer between the silicate layer and the Si substrate in that degradation of the device characteristics (such as lowered carrier mobility) is prevented.

It is to be noted that the continuous in-line processing including the UVO step and the MOCVD step described above may be executed in the cluster tool achieved in the embodiment by designating any two of the process modules $PM_1$, $PM_2$, $PM_3$ and $PM_4$ as a UVO module (UVO chamber) and an MOCVD module (MOCVD chamber).

In the UVO module, oxygen radicals are generated through ultraviolet excitation by bringing in a predetermined quantity of $O_2$ while radiating ultraviolet rays with a wavelength in the range of 190 through 380 nm with an ultraviolet ray lamp and an $SiO_2$ layer with a thickness of approximately 0.5 nm is formed at the surface of the Si substrate with the oxygen radicals thus generated.

The Si substrate having the $SiO_2$ layer with the 0.5 nm film thickness formed thereupon is then transferred into the MOCVD module within a vacuum environment, and the high-k silicate film is formed at the MOCVD module. The source gas is supplied onto the Si substrate heated to, for instance, 400~600° C. in the MOCVD module. The source gas is then decomposed over the heated Si substrate, thereby forming a thin film on the Si substrate.

It is generally considered to be best to set the length of processing time in the UVO step to 300 sec and set the length of processing time in the MOCVD step to 343 sec for such in-line processing during which the UVO step and the MOCVD step are executed continuously. Assuming that no post-processing is executed either at the UVO module (corresponds to the process module $PM_1$) or the MOCVD module (corresponds to the process module $PM_2$) and that the lengths of incoming wafer transfer time $AT_1$ and $AT_2$ and the lengths of outgoing wafer transfer time $BT_1$ and $BT_2$ at the modules $PM_1$ and $PM_2$ are each set at 10 sec, the total lengths of required time per wafer $ST_1$ and $ST_2$ corresponding to the modules $PM_1$ and $PM_2$ are calculated as below.

Namely, the total length of required time $ST_1$ at the UVO module $PM_1$ is calculated to be $PT_1+AT_1+BT_1=300+10+10=320$ sec, whereas the total length of required time $ST_2$ at the MOCVD module $PM_2$ is calculated to be $PT_2+AT_2+BT_2=343+10+10=363$ sec. Accordingly, the total length of required time $ST_2$ at 363 sec corresponding to the MOCVD module $PM_2$ is designated as the largest total length of required time ST(MAX). This means that a uniform module cycle period MT of at least 363 sec (preferably 363 sec) should be set for all the modules $PM_1$ and $PM_2$.

It is to be noted that while an explanation is given above in reference to the embodiment on an example in which the wait time occurs before the recipe processing time in a given process module during the wafer stay time elapsing between the time point at which an incoming wafer is brought in and the time point at which the processed wafer is carried out, the present invention is not limited to this example and the wait time may occur with any timing during the wafer stay time. For instance, the wait time may occur after the recipe processing is executed during the wafer stay time.

In order to set a uniform module cycle period MT for all the process modules $PM_n$, the time difference calculated by subtracting the total processing time $PT_n$ per wafer at each process module $PM_n$ from the module cycle period MT is set as the wait time $WT_n$ to occur while a wafer is within the process module $PM_n$. In this situation, the wait time $WT_n$ may be set to occur before the recipe processing time $PT_n$ so that the wafer having been brought into the process module $PM_n$ is kept in standby over the wait time $WT_n$ and then the recipe processing starts during the wafer stay time. However, the wait time $WT_n$ can be allocated to occur with any timing during the wafer stay time. For instance, the wait time $WT_n$ may occur after the recipe processing time $PT_n$, so that the wafer having undergone the recipe processing is kept in standby over the wait time $WT_n$ during the wafer stay time and once the wait time $WT_n$ has elapsed, the wafer is carried out of the process module $PM_n$.

Figure 10:
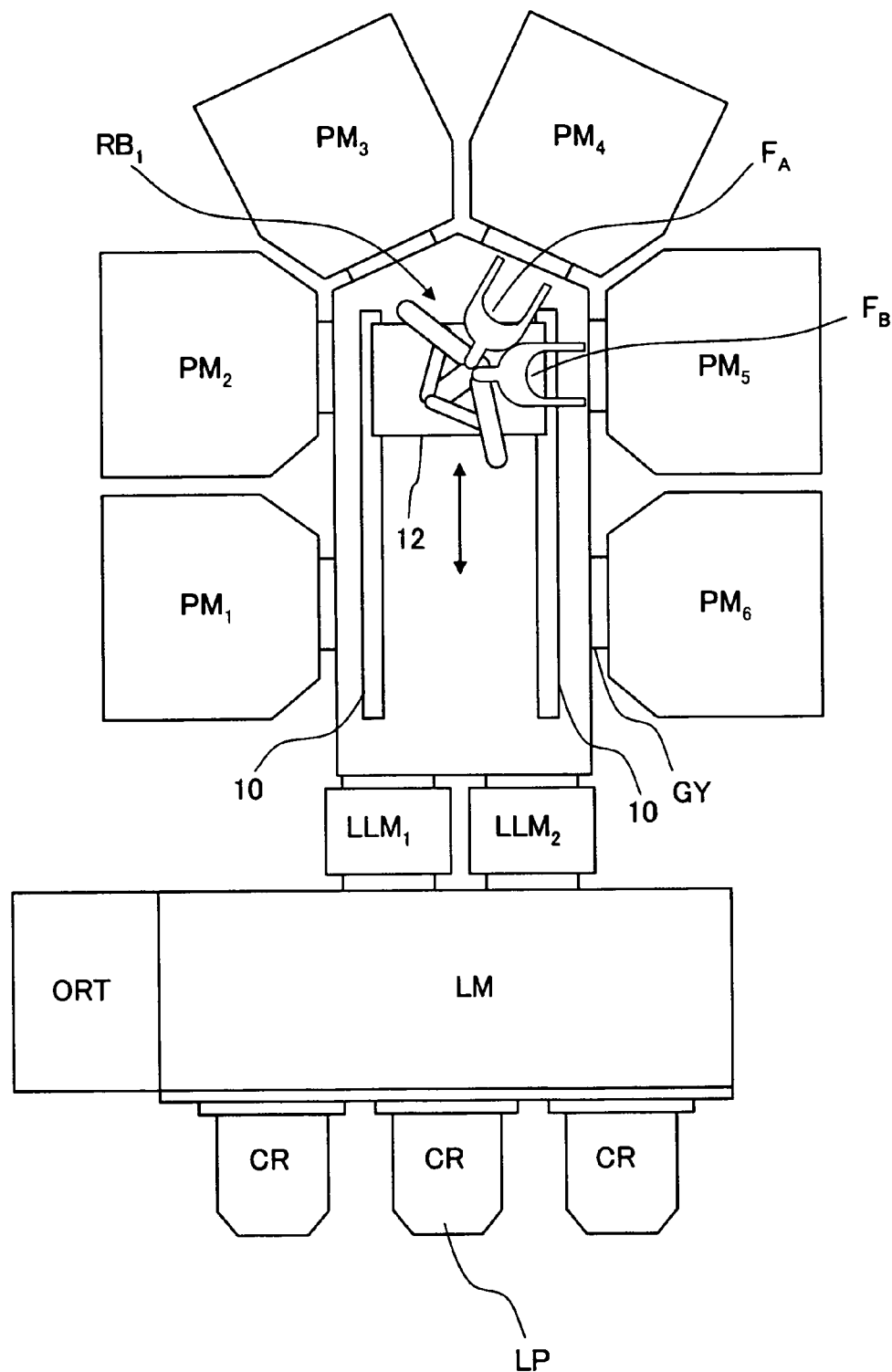
FIG. 10 schematically shows the structure adopted in the substrate processing system achieved in a second embodiment of the present invention.

The substrate processing system according to the present invention may adopt a structure other than that shown in FIG. 1 and allows for various modifications in its layout and structures of the various units thereof. For instance, a horizontally elongated transfer module TM may be used as shown in FIG. 10 to allow a greater number of process modules to be connected to the transfer module TM. The structure thus allows a greater number of process modules to be engaged in operation in the cluster tool.

In the substrate processing system shown in FIG. 10, six process modules are connected to the transfer module TM. Two rails 10 extending along the longer side of the transfer module TM are installed inside the transfer module TM and the transfer robot $RB_1$ includes a slider 12 that is allowed to slide over the rails 10 in the substrate processing system shown in FIG. 10. The transfer robot $RB_1$ in FIG. 10 includes a pair of transfer arms $F_A$ and $F_B$ capable of expanding/contracting along two different directions forming an acute angle (e.g., 60°) with each other. When these transfer arms $F_A$ and $F_B$ take turns moving into/out of each module connected to the transfer module TM for a pick and place operation, they do not need to rotate over a great angle.

The present invention may be adopted in a substrate processing system, part of, or the entirety of which operates in the atmosphere-side pressure, as well as in a vacuum substrate processing system such as that described in reference to the embodiments. In addition, the substrate may be any of various types of substrates for flat panel displays, a photo-mask, a CD substrate, a printed circuit board or the like, instead of a semiconductor wafer.

What is claimed is:

1. A substrate processing system that concurrently executes processing in two pipeline processing systems, in each of which a plurality of processing target substrates are sequentially transferred one at a time to a plurality of process modules to undergo processing, comprising:
a first set of process modules made up with a plurality of process modules used in a first pipeline processing system;
a second set of process modules made up with another plurality of process modules used in a second pipeline processing system;
a single transfer mechanism equipped with two transfer arms so as to be able to replace a processing target substrate having undergone the processing with a next processing target substrate by accessing each of said process modules only once; and
a control unit that:
sets module cycle periods, each corresponding to one of said process modules and each representing the sum of a substrate stay time over which a single substrate needs to stay in the process module to undergo processing, a delivery time and a retrieval time required to transfer the substrate or the sum of the substrate stay time, the delivery time, the retrieval time and a post processing time if post-processing is to be executed immediately following retrieval, to a uniform module cycle length by adjusting the length of the substrate stay time in correspondence to each process module before executing the processing on the substrate;
executes control for said transfer mechanism so that said transfer mechanism accesses said first set of process modules in an order matching the sequence in which the substrate is processed in said first pipeline processing system in correspondence to each module cycle;
executes control for said transfer mechanism so that said transfer mechanism accesses said second set of process modules in an order matching the sequence in which the substrate is processed in said second pipeline processing system in correspondence to each module cycle; and
permits concurrent processing in said two pipeline systems by executing access control for process modules in said first pipeline processing system and access control for process modules in said second pipeline processing system with a time lag matching a predetermined time adjustment width.

2. The substrate processing system according to claim 1, wherein:
said time adjustment width is determined based upon the length of time corresponding to a single module cycle.

3. The substrate processing system according to claim 2, wherein:
said time adjustment width equals ½ the length of time corresponding to a single module cycle.

4. The substrate processing system according to claim 1, wherein:
said time adjustment width is determined based upon the length of time representing a single module cycle and an attendant busy time representing the sum of delivery time and retrieval time required to transfer the substrate in each pipeline processing system or representing the sum of the delivery time and the retrieval time and the post-processing time if post-processing is to be executed immediately after retrieval.

5. The substrate processing system according to claim 4, wherein:
said time adjustment width equals ½ a value obtained by subtracting the difference between grand totals, each representing the sum of attendant busy time periods in each pipeline processing system, from the length of time representing a single module cycle.

6. The substrate processing system according to claim 5, wherein:
with the grand totals of the attendant busy time periods in said two pipeline processing systems (I) and (II) indicated as $\Sigma CT$ (I) and $\Sigma CT$ (II), MT representing the length of a single module cycle and GT (I) representing a time adjustment width to be applied to execute each access control phase for said first pipeline processing system with a time lag relative to each access control phase executed for said second pipeline processing system, said time adjustment width GT (I) is calculated as expressed $$GT(I)=[MT-(\Sigma CT(I)-\Sigma CT(II))]/2.$$

7. The substrate processing system according to claim 5, wherein:
with the grand totals of the attendant busy time periods in said two pipeline processing systems (I) and (II) indicated as $\Sigma CT$ (I) and $\Sigma CT$ (II), MT representing the length of a single module cycle and GT (II) representing a time adjustment width to be applied to execute each access control phase for said second pipeline processing system with a time lag relative to each access control phase executed for said first pipeline processing system, said time adjustment width GT (II) is calculated as expressed

GT(II)[MT−(ΣCT(II)−ΣCT(I))]/2.

8. The substrate processing system according to claim 1, wherein:
said transfer mechanism carries an unprocessed substrate into said first pipeline processing system and into said second pipeline processing system with a time lag matching the predetermined time adjustment width.

9. A substrate processing system according to claim 1, wherein:
when a first substrate in said batch of substrates is sequentially processed in a plurality of process modules in said first process module set or said second process module set, said first substrate is carried into each process module other than a process module where said first substrate undergoes first processing after said module cycle period corresponding to a virtual substrate which does not exist in reality but is assumed to have been processed prior to said first substrate elapses.

10. A substrate processing system according to claim 1, wherein:
said plurality of process modules are disposed around said transfer mechanism in an order matching the sequence with which said substrate is processed.

11. A substrate processing system according to claim 1, wherein:
said plurality of process modules each includes a vacuum chamber;
said transfer mechanism is installed inside a vacuum transfer chamber to which said process modules are individually connected each via a gate valve; and
said transfer mechanism transfers individual substrates within a vacuum environment.

12. A substrate processing system according to claim 11, wherein: at least one of said plurality of process modules is a film formation processing device that forms a thin film on said substrate.

13. A substrate processing system according to claim 11, wherein: a load-lock module is connected to said vacuum transfer chamber via a gate valve.

14. A substrate processing system according to claim 1, wherein:
said substrate stay time is calculated so that said module cycle length extends over equal lengths of time for all of said process modules by adjusting the length of a wait time over which a substrate is to wait in standby in each processing module, preceding or following the processing period over which the substrate is processed in said process module, which is added to said substrate stay time.

15. A substrate processing system according to claim 1, wherein:
total lengths of required time are calculated, each in correspondence to one of said process modules as a sum of the length of time required to process a single substrate and the lengths of time required to carry the substrate into/out of said process module as well as the length of any post processing to be executed immediately after the substrate is carried out and a largest total length of required time among said total lengths of required time is set as said module cycle length.

16. A substrate processing system according to claim 15, wherein:
in a process module with a total length of required time smaller than said module cycle length, the difference between said module cycle length and the total length of required time is allocated as said wait time and the sum obtained by adding a wait time to said total length of required time is set as a module cycle length for said process module.

17. A substrate processing system according to claim 1, wherein:
total lengths of required time are calculated, each in correspondence to one of said process modules in said first process module set or said second process module set as a sum of the length of time required to process a single substrate and the lengths of time required to carry the substrate into/out of said process module as well as the length of any post processing to be executed immediately after the substrate is carried out and a largest total length of required time among said total lengths of required time is set as said module cycle length.

18. A substrate processing system according to claim 17, wherein:
in a process module among said process modules in said first process module set or said second process module set with a total length of required time smaller than said module cycle length, the difference between said module cycle length and the total length of required time is allocated as said wait time and the sum obtained by adding a wait time to said total length of required time is set as a module cycle length for said process module.

19. A substrate processing system according to claim 1, wherein:
when a first substrate in the batch of substrates is sequentially processed in said plurality of process modules, said first substrate is carried into each process module other than a process module where said first substrate undergoes first processing after said module cycle period corresponding to a virtual substrate which does not exist in reality but is assumed to have been processed prior to said first substrate elapses.

* * * * *